United States Patent [19]
Katko

[11] Patent Number: 5,970,130
[45] Date of Patent: Oct. 19, 1999

[54] INDEPENDENT CENTRAL OFFICE WHICH PROVIDES LOCAL AND LONG DISTANCE CALLING SERVICES TO NEW RESIDENTIAL AND COMMERCIAL DEVELOPMENTS

[75] Inventor: Mark G. Katko, Toledo, Ohio

[73] Assignee: Dynamic Telcom Engineering, L.L.C., Cleveland, Ohio

[21] Appl. No.: 08/933,545

[22] Filed: Sep. 19, 1997

Related U.S. Application Data

[63] Continuation-in-part of application No. 08/890,589, Jul. 9, 1997, which is a continuation-in-part of application No. 08/806,471, Feb. 26, 1997.

[51] Int. Cl.⁶ .................................................. H04M 3/42
[52] U.S. Cl. ...................... 379/201; 379/231; 379/232; 379/234; 379/211; 370/352; 370/389
[58] Field of Search .................................. 379/201, 231, 379/232, 234, 211; 370/352, 389

[56] References Cited

U.S. PATENT DOCUMENTS

| | | | |
|---|---|---|---|
| 4,731,823 | 3/1988 | Warner et al. | 379/220 |
| 4,791,663 | 12/1988 | Rockne et al. | 379/113 |
| 4,802,199 | 1/1989 | Lange et al. | 379/221 |
| 4,897,870 | 1/1990 | Golden | 379/144 |

(List continued on next page.)

OTHER PUBLICATIONS

Abstract entitled "2FXO Module ISU Module or Plug–On," AdTran, Huntsville, Alabama, undated.
Abstract entitled "E&M/TO Module TSU/HSU Module or Plug–On," AdTran, Huntsville, Alabama, undated.
Abstract entitled "3630 MainStreet", 1993.
Abstract entitled "Ameritech Reconfiguration Service," Ameritech Data Solutions, undated.

*Primary Examiner*—Scott Wolinsky
*Assistant Examiner*—David Huynh
*Attorney, Agent, or Firm*—Woodcock Washburn Kurtz Mackiewicz & Norris LLP

[57] ABSTRACT

A LEC bypass technique which provides analog voice grade communications from a caller to an independent Central Office (CO) for local services and/or to a long distance inter-exchange carrier ("IXC") for long distance services by utilizing existing tariffed network data services and existing tariffed commercial DID/DOD services. The telephone switching equipment of an Independent Central Office is located in a new residential housing development (single detached, attached, or multi-family) or a new commercial development and used to provide local and long distance calling services, as well as Internet access and other telecommunications services, to the residents of the residential housing development or the tenants of the commercial development. The long distance service is provided using a hardwired LEC bypass connection that does not pass through the voice tariffed switch operated by the LEC, while the local service within the development as well as local service via the public switched network is provided via DID/DOD trunks purchased from the LEC and unbundled for use by the residents in the residential development or tenants in the commercial development. Residents in other new housing or commercial developments may also be serviced by the Independent Central Office by installing a D4 multiplexer on-site at the development and connecting to the Independent Central Office using the same LEC bypass techniques used for long distance access.

8 Claims, 10 Drawing Sheets

U.S. PATENT DOCUMENTS

| | | | |
|---|---|---|---|
| 4,924,500 | 5/1990 | Lewis et al. | 379/201 |
| 4,982,421 | 1/1991 | Kirsch et al. | 379/216 |
| 5,023,904 | 6/1991 | Kaplan et al. | 379/91 |
| 5,130,982 | 7/1992 | Ash et al. | 370/85.7 |
| 5,138,657 | 8/1992 | Colton et al. | 379/220 |
| 5,181,238 | 1/1993 | Medamana et al. | 379/95 |
| 5,193,087 | 3/1993 | Lichtash et al. | 370/58.2 |
| 5,214,692 | 5/1993 | Chack et al. | 379/265 |
| 5,276,444 | 1/1994 | McNair | 340/825.33 |
| 5,293,376 | 3/1994 | White | 370/54 |
| 5,406,583 | 4/1995 | Dagdeviren | 375/5 |
| 5,425,085 | 6/1995 | Weinberger et al. | 379/112 |
| 5,430,717 | 7/1995 | Fowler et al. | 370/58.2 |
| 5,459,779 | 10/1995 | Backaus et al. | 379/201 |
| 5,463,686 | 10/1995 | Lebourges | 379/220 |
| 5,465,294 | 11/1995 | Chapman, Jr. et al. | 379/207 |
| 5,475,749 | 12/1995 | Akinpelu et al. | 379/221 |
| 5,481,600 | 1/1996 | Alesio | 379/114 |
| 5,481,604 | 1/1996 | Minot | 379/221 |
| 5,510,777 | 4/1996 | Pile et al. | 340/825.31 |
| 5,517,562 | 5/1996 | McConnell | 379/207 |
| 5,524,142 | 6/1996 | Lewis et al. | 379/112 |
| 5,526,413 | 6/1996 | Cheston, III et al. | 379/201 |
| 5,533,111 | 7/1996 | Schlanger | 379/201 |
| 5,537,461 | 7/1996 | Bridges et al. | 379/88 |
| 5,537,464 | 7/1996 | Lewis et al. | 379/114 |
| 5,537,468 | 7/1996 | Hartmann | 379/221 |
| 5,539,817 | 7/1996 | Wilkes | 379/230 |
| 5,550,820 | 8/1996 | Baran | 370/60.1 |
| 5,550,912 | 8/1996 | Akinpelu et al. | 379/221 |
| 5,557,667 | 9/1996 | Bruno et al. | 379/201 |
| 5,566,235 | 10/1996 | Hetz | 379/201 |
| 5,570,410 | 10/1996 | Hooshiari | 379/32 |
| 5,574,783 | 11/1996 | Dunn | 379/230 |
| 5,583,926 | 12/1996 | Venier et al. | 379/207 |
| 5,583,929 | 12/1996 | Ardon | 379/230 |
| 5,619,562 | 4/1997 | Maurer et al. | 379/201 |

Outbound Calling

Incoming Calls

INDEPENDENT CENTRAL OFFICE WHICH PROVIDES LOCAL AND LONG DISTANCE CALLING SERVICES TO NEW RESIDENTIAL AND COMMERCIAL DEVELOPMENTS

CROSS-REFERENCE TO RELATED APPLICATIONS

The present application is a continuation-in-part application of U.S. patent application Ser. No. 08/890,589, filed Jul. 9, 1997, which is, in turn, a continuation-in-part application of U.S. patent application Ser. No. 08/806,471, filed Feb. 26, 1997, the contents of both of these applications hereby being incorporated by reference.

BACKGROUND OF THE INVENTION

1. Field of the Invention

The present invention relates generally to a telecommunications system for providing a central office which is independent of the local exchange carriers and, in particular, to a system which bypasses and thus does not require the involvement of an incumbent local exchange carrier central office with respect to vertical and call control features and other central office functions and which instead uses existing tariffed data network services and existing tariffed commercial DID/DOD services to provide central office functions to residents of new residential housing developments (single detached, attached, and multi-family) and tenants of new commercial developments.

2. Description of the Prior Art

The divestiture of American Telephone & Telegraph (AT&T) in 1984 resulted in the creation of seven Regional Bell Operating Companies ("RBOCs"). Since AT&T remained as purely a long distance carrier, the business of providing local telephone services came under the control of these seven RBOCs. After divestiture, the seven RBOCs (the "Incumbent Local Exchange Carriers" or "LECS") owned all of the expensive "hardwire" infrastructure necessary to provide local telephone services and owned the local networks to which all of the long distance carriers ("IXCs") had to pay access fees in order to originate and terminate their customer's long distance calls. Since the RBOCs had not been required to freely allow competition for local telephone service in the local markets, to date no company has been successful in entering the estimated $90 billion Local Exchange Carrier ("LEC") market in the United States on a large scale, large scale being defined as including residential customers. Therefore, regarding the provision of local telephone services across the United States, the AT&T divestiture in 1984 basically replaced a national monopoly (AT&T) with seven geographic monopolies (RBOCs).

Despite the passage of the Telecommunications Act of 1996, the purpose of which was to effect significant competition in the LEC markets, the existing RBOCs, due to their overwhelming size and their ownership of the existing infrastructure, have to date been successful in inhibiting any significant competition in the LEC market since any new entrant into the market has only two options for the provisioning of local telephone services: (1) building new infrastructure which is prohibitively expensive, or (2) successfully negotiating contracts with the incumbent LECs which require the payment of excessive fees to the incumbent LECs in order to utilize the LEC infrastructure to resell local telephone services. Neither of these options is particularly appealing since either option substantially favors the RBOCs in the following ways:

1. There is currently no viable, cost effective alternative to the conventional "hardwire" platform to allow large scale competition in the LEC market on a national basis or even on a regional basis.
2. The costs to build a new infrastructure today are prohibitive. In a Wall Street Journal article dated Feb. 12, 1996, the costs of building such an infrastructure were projected at $5 billion to "get started" and $20 billion to "extensively penetrate the market." It has since become clear to the entire telecommunications industry that these projected costs were very low. In 1996, both AT&T and MCI announced strategic plans calling for large scale (including residential customers) building of local networks to compete with the Incumbent LECs. However, neither AT&T nor MCI has pursued these plans and both have admitted that doing so, on a large scale, would not be economically feasible. On Jul. 14, 1997, the Wall Street Journal reported MCI's projected loss of $800 million in its attempt to build local networks in a number of metropolitan markets to begin to compete for local commercial accounts. This news caused MCI to lose $5 billion of market value in one day! AT&T has also suffered significant losses in its attempt to enter the LEC market.
3. The RBOCs have enjoyed one of the highest operating cash flow margins of any U.S. industry, over double that of the IXCs. While the LEC business has remained "proprietary," the long distance business, with its increased competition, has become much more of a "commodity" business. AT&T has had its market share drop to 54% since 1984 and has had its average revenue per minute cut almost in half. Hence, AT&T and MCI are not in a position to "outspend" the RBOCs in infrastructure development.
4. The RBOCs have all filed to become long distance service providers ("IXCs"). In contrast to the plight of AT&T and MCI in their attempts to enter the LEC market, there are no costly infrastructure obstacles blocking entry of the RBOCs into the IXC market: the RBOCs can buy ready made networks from IXC providers at wholesale rates for immediate deployment. The RBOCs initially announced that their initial strategies regarding the provision of long distance services would be to resell, where discounts usually run about 80%. However, in contrast, the resale discounts the RBOCs originally intended to offer the IXCs for resale of local services were closer to 10–15%.

To ensure their own competitive survival, the IXCs must make inroads into the profitable LEC market. However, to date no technology has been proposed which would enable a company independent of the RBOCs to provide local telephone services at a competitive cost. None of the previously available solutions is economically viable for the reasons noted above. There is thus a great need in the art for a system and method which would enable a company independent of the RBOCs to provide cost competitive local telephone services, and hence meaningful competition to the incumbent RBOCs in the LEC market, without requiring a cost prohibitive infrastructure investment.

Accordingly, a LEC bypass technique is desired which permits cost effective competition with the Incumbent LECs in the local telephone market without requiring specialized customer premises equipment, without significant infrastructure investment, and without "deals" with the Incumbent LECs. Embodiments of the present invention have been designed to meet this great need in the art.

Embodiments of the present invention have also been designed to meet another great need in the art, the need to significantly reduce the monopolistic access charges charged by the LECs on most long distance calls, charges which cost customers tens of billions of dollars each year. Most long distance calls must be originated through the LEC switch, and most calls are terminated by the LEC switch as well. Therefore, access charges payable to the incumbent LECs continue to be incurred. Specifically, with respect to outgoing calls placed from a subscriber location, the LEC switch which serves the subscriber's customer premises equipment senses an off-hook condition and extends dial tone. When the dialed digits are received in the LEC switch, any features associated with the originating subscriber, such as speed dialing, are applied to the call, and the call is then routed to the desired destination. If the call is a long distance call that is routed to a long distance or inter-exchange carrier (IXC), then the IXC will pay originating end and terminating end "access charges" to the LEC for servicing the call, and the subscriber will, in turn, pay the IXC for the total cost of the call.

Currently, the access charges paid to LECs by the IXCs for the use of carrier common line service vary by LEC but can, depending on a call's duration and cost per minute, constitute upwards of 40% of the overall cost of the call. Accordingly, eliminating the stranglehold the LECs have on the local market and their claims to the originating end access charges could save a significant percentage of the cost of a long distance call. Bypassing the LEC and the associated originating end access charges could also save the IXCs a significant portion of their service costs for providing long distance calls and, once the associated savings are passed on to their subscribers, potentially save their subscribers billions of dollars each year in long distance charges. Payment of such access charges remains a key issue in the telecommunications industry since the passage of the Telecommunications Act of 1996 and is one of the primary obstacles to enhanced competition between the LECs and other potential entrants into the local telecommunications marketplace. As a result, any long distance service provider who can bypass the LEC and avoid payment of the originating end access charges will be at a substantial competitive advantage. Not unexpectedly, the RBOCs are utilizing every possible means to protect their access charge monopoly, and hence, have currently tied up the implementation of certain provisions of the Telecommunications Act of 1996 in district court litigation.

The inventor is aware of only three prior art techniques by which to complete a long distance call without paying the access charges to the LEC.

The first prior art technique known to the inventor for bypassing the LEC is to provide a separate communications system which provides the subscriber with access to the unregulated long distance telephone carriers through an alternative transmission path besides telephone lines into the subscriber's premises. For example, Baran describes in U.S. Pat. No. 5,550,820 a bi-directional communications system which bypasses the LEC by conveying voice and data over cable television lines from the customer premises to a switching unit that has the functionality of a Class 5 central telephone office switch (5ESS) and is connected to the public switched telephone network. In the system described by Baran, special terminal units are provided at the customer premises, and the signals from the terminal units are converted by a relay transceiver bi-directionally between the signal format of the terminal units and fixed length compliant asynchronous transfer mode ("ATM") cells. These ATM cells are then transmitted via the cable television bandwidth to a cable television hub where the ATM cells are bi-directionally converted by a transmission interface unit into time division multiplexed signals in the upstream direction away from the terminal units for connection to a cellular telephone switch, and from time division multiplexed signals into fixed length compliant ATM cells in the downstream direction towards the terminal units.

While the system described by Baran does indeed bypass the LEC, it still encumbers the subscriber and long distance carrier with many of the same problems as the conventional telephone system. In particular, since the cable television lines are typically owned and operated by a cable television company, access charges are still payable to the cable television company. Also, additional equipment, namely, the terminal units, is required at the customer premises, leading ultimately to additional cost to the subscriber.

The second prior art technique known to the inventor for bypassing the LEC is to create a virtual piped connection over the conventional telephone lines using specialized customer premises equipment at the subscriber location and a specially configured call control platform in the IXC network to originate and receive calls using in-band signaling techniques. Such a technique is described in U.S. Pat. No. 5,533,111, where Schlanger describes a system utilizing a specialized multiplexer to create a virtual piped connection by converting an analog trunk signal into a usable in-band digital carrier. The virtual pipe is established through an initial call made from the specialized customer premises equipment, while in a conventional mode, to the call control platform. Once the virtual pipe is established, the specialized customer premises equipment operates in a bypass mode such that calls made by the subscriber using the specialized customer premises equipment "bypass" the LEC. As long as the virtual pipe exists, the IXC can provide vertical and call control features and functions for incoming and outgoing calls using in-band signaling, while the call control functions typically provided by the customer premises equipment using out-of-band signaling, such as call origination, off-hook, on-hook, and ringing, are provided using in-band signaling. However, conventional out-of-band signaling may still be used to provide conventional LEC features such as call waiting. The virtual pipe to the call control platform may be used for a plurality of calls without being disconnected since the customer premises equipment is prevented from generating a conventional out-of-band mode disconnect signal until breakdown of the virtual pipe is requested by the subscriber. As a result, a subscriber can make one call and pay for one access connection via the LEC and then use that single access connection indefinitely to produce calls across that "virtual" channel.

While the in-band signaling technique described by Schlanger can greatly reduce the amount of access charges paid by the subscriber and long distance carrier, such a technique is disadvantageous in that specialized customer premises equipment is required that must be carried around by the subscriber. Such equipment adds greatly to the cost for the subscriber and is also a very inconvenient way to implement LEC bypass for the subscriber.

The third prior art technique known to the inventor for bypassing the LEC is for the subscriber to lease a DS1 (T1) line to provide direct switch to switch access to the IXC. However, this approach is prohibitively expensive to all but those companies with very high call volumes sufficient to justify the cost of a T1 line. Leasing a T1 line is quite impractical for companies or individuals with relatively small call volumes where the leasing costs of the T1 line alone would be greater than the amount otherwise paid in originating end access charges.

Accordingly, a LEC bypass technique is further desired that does not require specialized customer premises equipment and which is thus more cost competitive. A LEC bypass technique is also desired which extends the benefits of direct T1 access to smaller volume callers without the associated costs of leasing an entire T1 line. Further embodiments of the present invention have been designed to meet these great needs in the art as well.

SUMMARY OF THE INVENTION

The present inventor has met the above-mentioned needs in the art by creating a new telecommunications network platform for providing local and long distance telecommunications services independent of the existing infrastructure managed by the LECs. Those skilled in the art will appreciate that the techniques described herein permit the cost effective creation of a hardwire platform of infrastructure and Central Offices (COs) in many areas throughout the United States.

In particular, the present invention relates to a LEC bypass technology which provides analog voice grade communications from a caller to an independent Central Office (CO) for local services and/or to a long distance inter-exchange carrier ("IXC") for long distance services by utilizing existing tariffed network data services and existing tariffed commercial DID/DOD services. Through the bundling of communications services such as dial tone, long distance, Internet access, and security system monitoring, a company independent of the incumbent LECs will be able, using the techniques of the invention, to offer these services in a bundled platform offering a 20% to 30% savings to the consumer over existing services of these types. As will be explained below, this may be accomplished in accordance with the invention without requiring the subscriber to purchase any new costly hardware. Instead, the LEC bypass is accomplished utilizing existing technology within the LEC's tariffed equipment which effectively permits a plurality of subscribers to share DS1 (T1) lines for their Central Office services and long distance calling.

Several embodiments of the invention provide analog voice grade communications from a caller to an independent Central Office (CO) by utilizing existing tariffed network data services and tariffed DID/DOD commercial services. Other embodiments of the invention provide LEC bypass for local and long distance services. In each case, a hardwire connection is established between the independent CO and/or the IXC and the customer premises. This connection allows a subscriber to "bypass" the LEC switching equipment and thus does not require involvement of the local service provider's tariffed voice switch and the associated access charges. The hardwire connection is created by purchasing analog data facilities from the LEC which originate at the LEC Central Office. These facilities are connected directly to a D4 multiplexer at the Central Office or at a site remote from the Central Office and outside of the control of the LEC. The voice interface modules typically used in the D4 multiplexer are then replaced by Foreign Exchange Subscriber (FXS) modules which are typically used to interface a customer's data terminal equipment to T1 or fractional (FT1) services. The terminating end is installed at the subscriber premises and terminated on a standard RJ11X four wire jack.

Alternatively, a private cable may connect the remote D4 multiplexer to the subscriber premises. A T1 high capacity digital facility is also ordered from the LEC to terminate to the D4 multiplexer, and the T1 is D4/AMI or ESF/B8ZS configured for 56 or 64 kbps DS0 channels. The terminating end of the T1 is terminated on a K01 digital electronic cross-connect system (DEXCS) frame which is ordered from the LEC as a reconfigurable data service with customer access. Each of the channels of the T1 is then configured by the customer using the reconfiguration service at the end pointing towards the D4 multiplexer with Foreign Exchange Office (FXO) Loop Start signaling. A T1 is also ordered from the LEC to connect the DEXCS to the independent CO and/or the IXC and is also D4/AMI or ESF/B8ZS configured for 56 or 64 kbps DS0 channels. Each of the channels of this T1 is also configured by the customer using the reconfiguration service at the end pointing towards the IXC or independent CO with FXS Loop Start signaling. The IXC terminates the T1 within the IXC network and switches the call and performs all required features associated with the call connection in a conventional manner. Similarly, the independent CO terminates the T1 within the independent CO facility and provides the conventional Central Office features such as dial tone and call waiting to the subscriber.

In alternative embodiments, a T3 (DS-3) or higher high capacity digital line may connect the D4 multiplexer to the DEXCS frame. In such embodiments, one or more T3:T1 DACCS systems and one or more T3 multiplexers may be used to interface the T1 lines to the T3 lines. Of course, if higher capacity lines were used, higher capacity multiplexers would be required.

In another alternative embodiment, direct analog connections from the customer premises to the DEXCS frame are utilized. In such an embodiment, the DEXCS will accept analog interface cards which are a tariffed service provided by the LEC. The DEXCS is programmed as FXS signaling at the tandem side of the office and FXO to the T1 carrier side. A cross-connect is established to complete the circuit pathway. However, those skilled in the art will appreciate that the cost of such a connection and long-haul analog data lines may be prohibitively expensive.

In preferred embodiments, the independent Central Office comprises telephone switching equipment such as a private branch exchange ("PBX") connected between the LEC bypass data line and a local telephone network managed by the Incumbent LEC. The independent Central Office may also comprise a channel service unit connected to the LEC bypass data line and a DS1 conversion card connected between the telephone switching equipment and the channel service unit. Alternatively, a D4 multiplexer may connect the channel service unit to at least one analog trunk within the telephone switching equipment, where the D4 multiplexer comprises a converter which converts analog voice signals from the analog trunk to digital signals for application to the channel service unit.

In presently preferred embodiments, the D4 multiplexer connected to the analog data line from the subscriber premises may be located at a location remote from the Central Office of the Incumbent LEC (such as in a new residential housing or commercial development) and housed in a weatherproof housing at or near the subscriber's premises. In this case, the analog data line may be a private cable laid between the remote D4 multiplexer and the subscriber's premises.

In another, currently preferred embodiment, the telephone switching equipment of the independent CO is also located in a new residential housing development (single detached, attached, or multi-family) or a new commercial development and used to provide local and long distance calling services, as well as Internet access and other telecommunications services, to the residents of the residential housing development or to the tenants of the commercial development. The long distance service is provided as described above, while the local service within the development as well as local service via the public switched network is provided via DID/DOD trunks purchased from the LEC and unbundled for use by the residents in the residential development or tenants in the commercial development.

Since this CO platform is provided in new service areas not presently serviced by the Incumbent LECs, new infrastructure may be purchased which is not in direct competition with that provided by the incumbent LECs. Then, the LEC bypass technology of the invention permits the new infrastructure to be connected into the existing public switched network at tariffs substantially below the tariffs of conventional residential voice lines, thus permitting the cost savings for the community's residents which make the technique of the invention economically viable.

Thus, the present invention provides the first platform for the provision of a complete package of local and long distance services without having to negotiate cohabitation or resale agreements with the LECs. Moreover, since the independent Central Offices of the invention may independently gather billing data and perform other conventional Central Office functions, the system of the invention is not dependent on the LECs for customer support or for the gathering of billing data.

BRIEF DESCRIPTION OF THE DRAWINGS

The objects and advantages of the invention will become more apparent and more readily appreciated from the following detailed description of the presently preferred exemplary embodiments of the invention taken in conjunction with the accompanying drawings of which.

DETAILED DESCRIPTION OF PRESENTLY PREFERRED EMBODIMENTS

A method and system for bypassing a local exchange carrier (LEC) and for creating a hardwire platform and independent central office in a new residential housing development or new commercial development in accordance with the presently preferred exemplary embodiments of the invention will be described below with reference to FIGS. 1–10. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

LONG DISTANCE INTER-EXCHANGE CARRIER ACCESS

Figure 1:
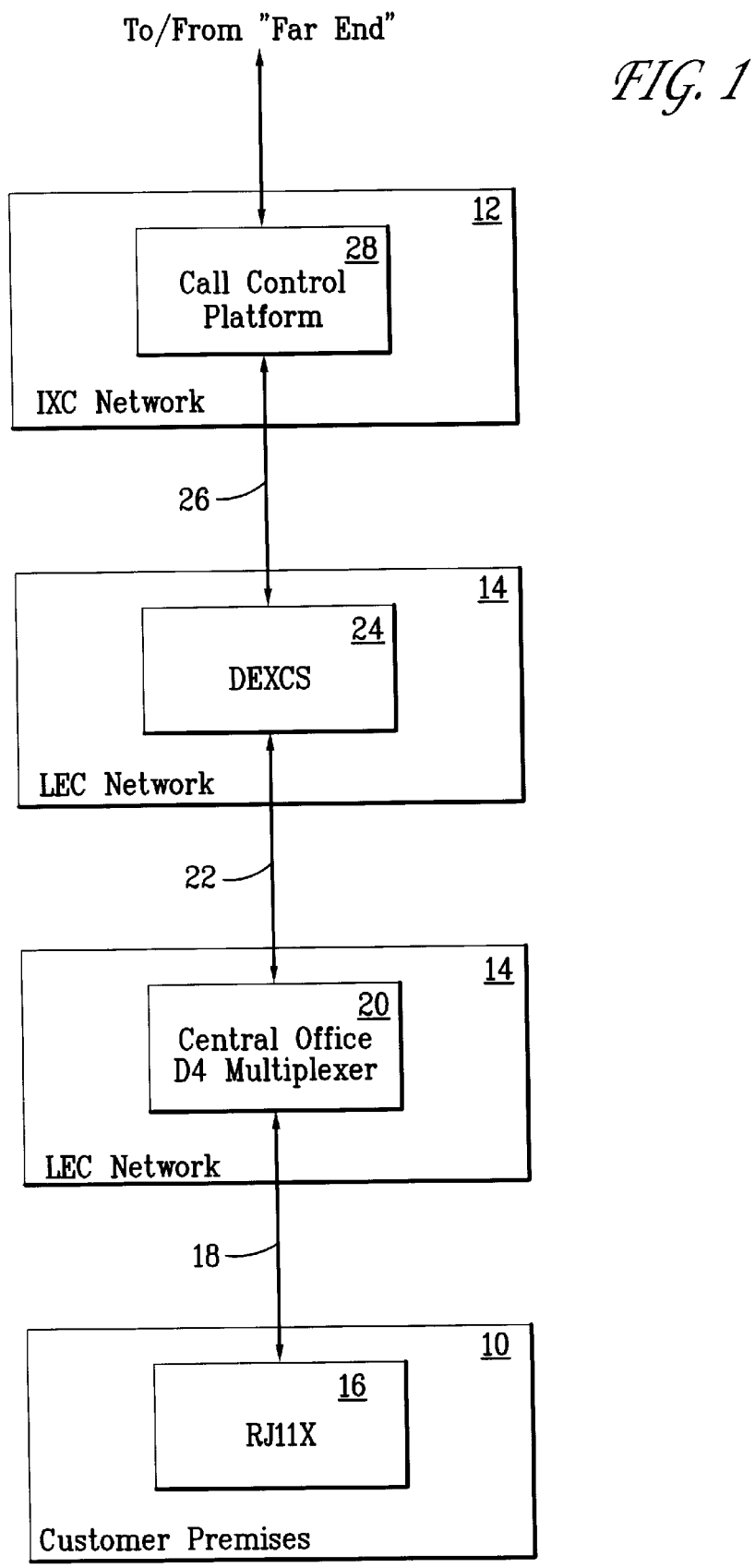
FIG. 1 is an overall block diagram illustrating the hardwire connection between the subscriber premises and the IXC network for bypassing the LEC originating end access charges in accordance with the invention.

The embodiments of FIGS. 1–4 of the present invention relate to a method and apparatus for bypassing LEC equipment tariffed for voice services to provide a customer with direct access, without access charges, to a long distance inter-exchange carrier (IXC). As shown in FIG. 1, such bypass is accomplished in accordance with a preferred embodiment of the invention by creating a hardwire connection between the customer premises 10 and the IXC network 12 via the LEC network 14 using only LEC equipment tariffed for data transmission. As illustrated, the terminating end of the hardwire connection is installed at the customer premises 10 and terminated on a standard RJ11X four wire jack 16. An analog data line 18 is connected directly to the LEC's Central Office D4 multiplexer 20 instead of the conventional DS0 digital data line. As will be explained in more detail below, the voice interface modules typically used in the D4 multiplexer are replaced by Foreign Exchange Subscriber (FXS) modules which are typically used to interface a customer's data terminal equipment to T1 or fractional (FT1) services. In accordance with the invention, the FXS modules instead provide A/D and D/A conversion of the voice data provided over the analog data line 18 and also introduce an analog carrier into the D4 multiplexer 20 which is programmed to provide ground start or E & M signaling at the bit level (A=1; B=0) to provide the routing and voice data to the IXC network 12 using techniques known in the art. A T1 high capacity digital line 22 which is D4/AMI or ESF/B8ZS configured for 56 or 64 kbps DS0 channels connects the Central Office D4 multiplexer 20 to a tandem "toll" Central Office and is terminated on a K01 digital electronic cross-connect system (DEXCS) frame 24 which provides software switching of digitized voice data at the channel level. The K01 DEXCS frame 24 is preferably ordered from the LEC as a reconfigurable data service with customer access, and each of the channels of the T1 line 22 is then configured by the customer using the reconfiguration service at the end pointing towards the Central Office D4 multiplexer 20 with Foreign Exchange Office (FXO) Loop Start signaling. A T1 line 26 which is D4/AMI or ESF/B8ZS configured for 56 or 64 kbps DS0 channels connects the DEXCS frame 24 to the IXC network 12, and each of the channels of the T1 line 26 is also configured by the customer using the reconfiguration service at the end pointing towards the IXC with FXS Loop Start signaling. The IXC terminates the T1 line 26 within its own Call Control Platform 28 and switches the call to/from the called party/calling party premises and performs all required features associated with the call connection in a conventional manner.

Unlike the afore-mentioned Schlanger virtual connection which is set up and torn down by the user in order to make long distance calls, the hardwire connection of the invention is permanent and is not torn down. Originating end access charges payable to the LEC are bypassed by using dedicated voice grade quality tariffed D4 data lines where the signaling for the voice channels is carried "in-band" and the analog to digital conversion of the voice channel is performed at the D4 multiplexer using Foreign Exchange Subscriber (FXS) modules. Moreover, by configuring the T1 line 22 for a plurality of DS0 channels, each customer may be assigned a portion of a T1 line and share the costs of that T1 line service with, for example, up to 23 other customers. The necessary hardware may be purchased from the LEC and configured without LEC assistance. Since the T1 data network tariff is significantly less costly than the network tariff for voice services, savings of up to 55% compared to the costs of conventional LEC access charges are possible using the LEC bypass technique of the invention.

Figure 2:
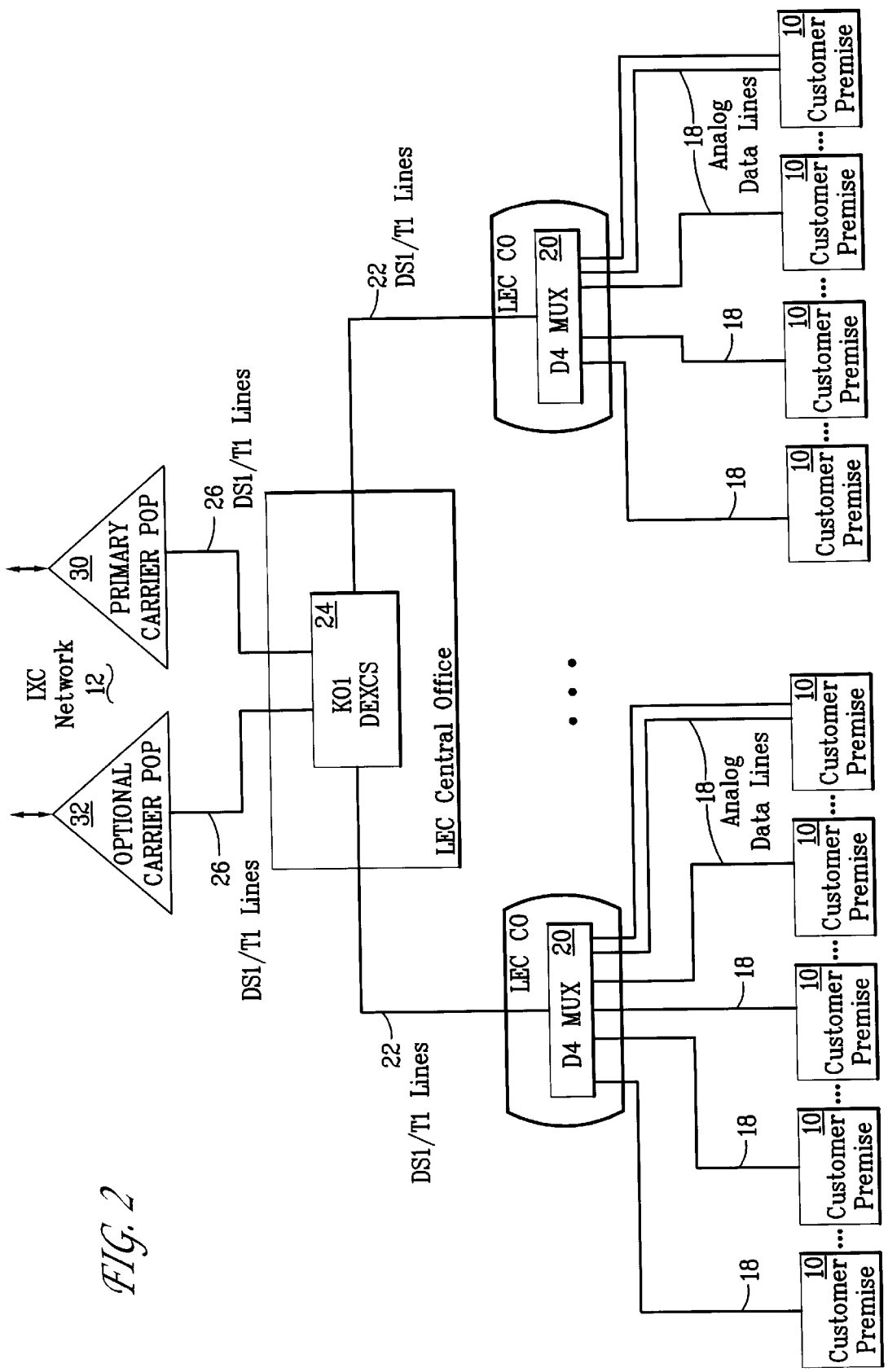
FIG. 2 illustrates in more detail the hardwire connection between the subscriber premises and the IXC network in accordance with the invention.

FIG. 2 illustrates the hardwire connection of FIG. 1 in more detail. As shown, the hardwire connection of the invention is terminated on a standard RJ11X four wire jack 16 at the customer premises 10 and connected via standard analog data (4-wire leased) lines 18 to a D4 multiplexer 20 at the LEC's central office. As shown, each customer may have one or more analog data lines 18 and, as will be explained below, access to one or more DS0 lines in the T1 line 22. In accordance with the invention, the Network Interface (NX) card typically used at the D4 multiplexer 20 for connecting the subscriber's data terminal to the telephone network is replaced by a Foreign Exchange Service (FXS) module, such as the 2FX0 Module available from Adtran. Typically, the FXS module is used to provide local telephone service from a central office which is foreign to the subscriber's exchange area. However, in accordance with the invention, the FXS module is used to terminate an analog PBX and to channelize (i.e., to multiplex-demultiplex wider bandwidth or higher speed channels into narrower bandwidth or lower speed channels) the central office D4 multiplexer DS0 card assignments by introducing FXS ground start or ear and mouth (E&M) analog signaling at the bit level, where bits are toggled so as to effectively modulate the digital carrier wave from the D4 multiplexer 20 with an analog signal containing the call routing information to thereby provide the analog voice signal via in-band signaling. For example, the E band may carry ANI data while the M band may carry the IXC carrier switching data. Framing of the digitized signal to/from the D4 multiplexer 20 is preferably Superframe Audio Messaging Interchange (AMI) line code. Importantly, the FXS module includes A/D conversion circuitry for digitizing the analog voice signal from the subscriber premises 10 and D/A conversion circuitry for converting to analog the network signal to be sent to the customer premises 10. The D4 multiplexer 20 is typically reconfigured by the customer using the network reconfiguration service conventionally available to customers to allow them to control, rearrange and switch the private line voice and analog data. The customer may dial in the appropriate instructions or call a service number and have a LEC attendant do the reconfiguration. Alternatively, in accordance with the invention it is contemplated that a T1 service provider could lease T1 lines from the LEC and lease slots in those T1 lines to a plurality of customers and handle the reconfiguration as part of the leasing service.

The D4 multiplexer 20 provides the modulated digital data to the digital electronic cross-connect system (DEXCS) 24 via T1 lines 22. The data is preferably transmitted over T1 lines 22 using private line interconnect T1 signaling with optional Superframe AMI or extended Superframe binary 8 zero substitution (ESF/B8ZS) channelized into 56 or 64 kbps DS0 data channels by the DEXCS equipment 24.

The DECXS equipment 24 (otherwise known as a Digital Access and Crossconnect System (DACCS)) is part of a facilities network for assembling small facility inputs such as a 1.5 Mbit DS1 signal into large facility outputs such as for fiber optic transmission, and for disassembling large facility inputs into small facility inputs. The DEXCS equipment 24 is typically located at a tandem central office and switches small facility outputs to destination outputs at the T1 (DS1) channel level for use by the switched public common carrier network and for use by private network customers. The DEXCS equipment 24 is responsive to an operation support system (OSS) which provides the basic information needed by the DEXCS equipment 24 to set up the long term connections within each DEXCS system for carrying information of a plurality of trunks. In accordance with the invention, the OSS provides a network reconfiguration service which allows the subscriber to modify his or her system remotely using a dial-up modem and a personal computer. Desired changes in the cross-connect devices that terminate the T1 digital lines 22 and 26 are communicated to the LEC via the customer's personal computer and are performed within minutes or scheduled to occur at any desired future time. Alternatively, the changes are phoned in to a LEC attendant to perform the desired reconfiguration service.

In accordance with the invention, the DEXCS equipment 24 is reconfigured as follows. First, the DEXCS equipment 24 is ordered as a reconfigurable data service with customer access from the LEC. Each of the channels of the T1 (DS1) is then reconfigured at the end pointing towards the Central Office D4 multiplexer 20 with Foreign Exchange Office (FXO) Loop Start Signaling. The port configurations of the DEXCS equipment 24 are also reconfigured to be FXS toward the far end Central Offices and FXO toward the carrier. Bit signaling is E&M or ground start, and framing is preferably either extended Superframe or Superframe carrier signaling using either AMI or B8ZS. The T1 is channelized into DS0s which are assigned by port signaling Superframe AMI or ESF/B8ZS A&B (A=1; B=0) bits which are toggled FXO per channel. Ground start or E&M signaling at the bit level may also be provided as desired so that the routing information may be stripped off of the digital signal from the D4 multiplexer 20 and the digitized signal routed to the IXC network 12 in a conventional manner. T1 lines 26 are also ordered from the LEC to connect the DEXCS equipment 24 to the IXC network 12 and are also D4/AMI or ESF/B8ZS configured for 56 or 64 kbps DS0 channels. Each of the channels of each T1 line 26 is also configured by the customer using the reconfiguration service at the end pointing towards the IXC network 12 with FXS Loop Start signaling. The IXC network 12 terminates the T1 at a primary long distance carrier point of presence (POP) 30 and at an optional long distance carrier point of presence (POP) 32. As known by those skilled in the art, the POPs 30 and 32 are the points at which the LEC terminates subscriber circuits for long-distance dial-up or leased line communications.

Thus, to establish the hardwire connection in accordance with the invention, the subscriber must order the following services from the LEC:

1. DEXCS service;
2. T1 service originating from the DEXCS to the IXC POP;
3. T1 service originating from the DEXCS to the Tandem Central Office;
4. D4 multiplexing service at the Tandem Central Office with 24 cards in each D4 multiplexer (for 24 customers per T1 line); and
5. Analog data lines originating from the Tandem Central Office D4 multiplexer to the customer premises.

These elements make up the hardwire connection in accordance with the invention. Once these services have been provided by the LEC, the reconfiguration steps described above must be performed to activate the DEXCS equipment 24 using the network reconfiguration service. By way of example, the following reconfiguration steps are performed using the Ameritech Reconfiguration Service:

1. Login to the DEXCS system 24 using dial-up software provided by the LEC.
2. Upon login, select "end link listings" from the menu screen.
3. From the end link listings screen, select "circuit to IXC."
4. Select the first channel in the circuit and press "enter."
5. Scroll down the page to the "Com Type" setting.
6. Simultaneously hit the <Ctrl>+<n> keys to list Com Types.
7. Scroll down the list of Com Types to get the FXO settings.
8. Press <Enter> to complete the change to the Com Type.
9. Exit the end link listings.
10. Move to channel two.
11. Repeat steps 4–10 until all 24 channels are set to FXO.
12. From the "end link listings" screen, now select "circuit to Tandem Central Office."
13. Repeat steps 4–6.
14. Scroll down the list of Com Types to get the FXS setting.
15. Repeat steps 8–11 using the FXS setting.
16. Go to the reservation segment listing menu when all Com Types are complete.
17. From the command line type "reserve" and press <Enter>.
18. Move the cursor to "Point 1" and type in the name of the IXC circuit.
19. Move the cursor to "Point 2" and type in the name of the Tandem Central Office circuit.
20. Select "Contiguous Channel", type in "24" and press <Enter>.

The DEXCS equipment 24 is now programmed to bypass the access charge required by the LEC when using conventional voice lines. Those skilled in the art should note that the above 20 step process is required by the Ameritech Reconfiguration Service but that other LECs may offer slightly different interface software for the same purpose.

Once the DEXCS equipment 24 is reconfigured, the hardwire connection between the customer premises 10 and the IXC network 12 is complete and the LEC bypass system of the invention is ready for use. The hardwire connection of the invention compares to the bypass connection described by Schlanger as follows. The bypass connection in the Schlanger system requires AT&T Central Office trunk lines, AT&T switching hardware, AT&T proprietary customer premises equipment, and an AT&T Virtual Central Office Trunk transport. By contrast, the hardwire connection of the invention uses 4-wire lease lines 18 connected to DEXCS equipment 24 for signaling and D4 multiplexers for D/A and A/D conversion via DS1 (T1) lines configured for data transport. Importantly, no specialized customer premises equipment or virtual central office trunk transport is required. Also, since the subscriber's line is not constantly tied up with a virtual connection, no vertical call control functions and the resulting modifications to the call control platform 28 proposed by Schlanger are needed.

During operation, the customer uses his or her telephone equipment to place long distance calls in a conventional manner. No special steps or equipment are necessary. Once the connection is established with the called party, the voice signal is provided by in-band signaling over the T1 line 22 between the DEXCS equipment 24 and the D4 multiplexer 20, which are synchronized to each other. However, at the receiving end, rather than data, voice information is D/A converted and provided to the called party.

In accordance with the invention, each T1 line 22 is preferably shared by up to 24 end user customers at respective customer premises 10. Of course, some customers may use more than one T1 channel as necessary to accommodate their call volume. Accordingly, the cost of the T1 line 22 ordered from the LEC can be distributed among up to 24 customers. Hence, each customer would pay only a fraction of the monthly cost of a tariffed T1 data line 22 instead of paying a large originating access fee per minute of each long distance call. As noted above, this amount is up to 55% less than what the customer would pay in LEC access charges for conventional voice service. The terminating access fee is not affected by the invention and would still be payable to the LEC by the IXC and, in turn, by the customer to the IXC. Of course, the present invention is most cost effective when the customer is a business or an individual who makes many long distance calls.

Figure 3:
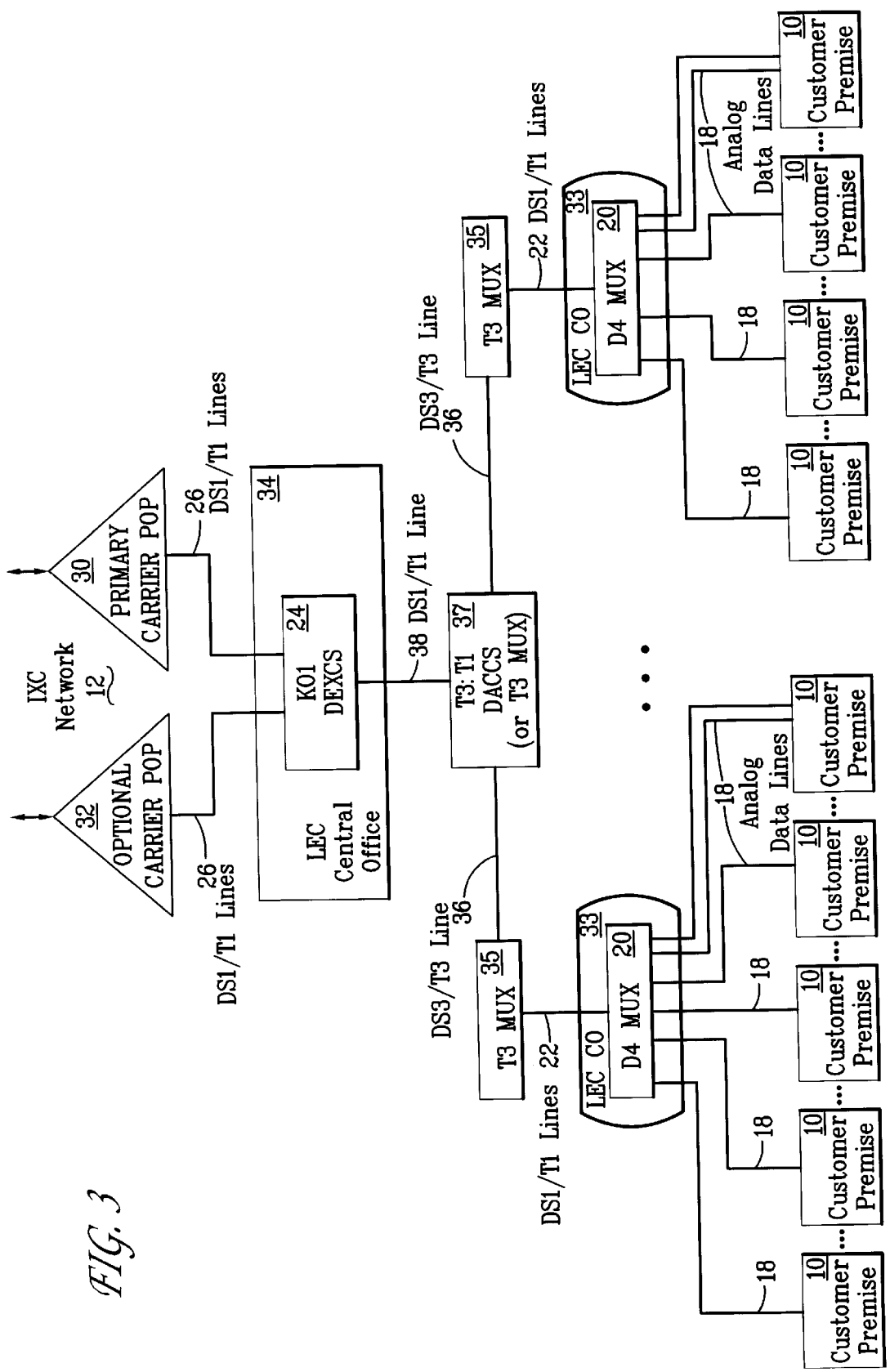
FIG. 3 illustrates the hardwire connection between the subscriber premises and the IXC network as in FIG. 1 except that T3 lines are used as input into the DACCS (or DEXCS) frame.

Those skilled in the art will appreciate that any multichannel digital transmission line at DS-1 or above, such as a T3 line (28 T1 lines) or an optical carrier line (preferably OC3 or OC12), may be used to transmit voice data in accordance with the techniques of the invention. By way of example, FIG. 3 illustrates an alternative embodiment of the invention in which a T3 (DS-3) line connects a LEC Central Office 33 with its tandem Central Office 34. In this embodiment, a T3 multiplexer 35 multiplexes/demultiplexes the T1 lines 22 to the T3 lines 36 and vice-versa. At the tandem Central Office side, another T3 multiplexer or a T3:T1 Digital Access and Cross-Connect System (DACCS) 37 may be used to multiplex/demultiplex the T3 lines 36 to the T1 line 38, and vice-versa. As known to those skilled in the art, the DACCS 37 is similar to a DEXCS frame 24 but connects T3 lines to T1 lines. As illustrated, the other end of the T1 line connects to the K01 DEXCS frame 24 just as in the embodiment of FIG. 2. A similar arrangement to FIG. 3 could be used for optical fiber (OC-3 or OC-12) connections. The embodiment of FIG. 3 is otherwise the same as the embodiment of FIG. 2.

Figure 4:
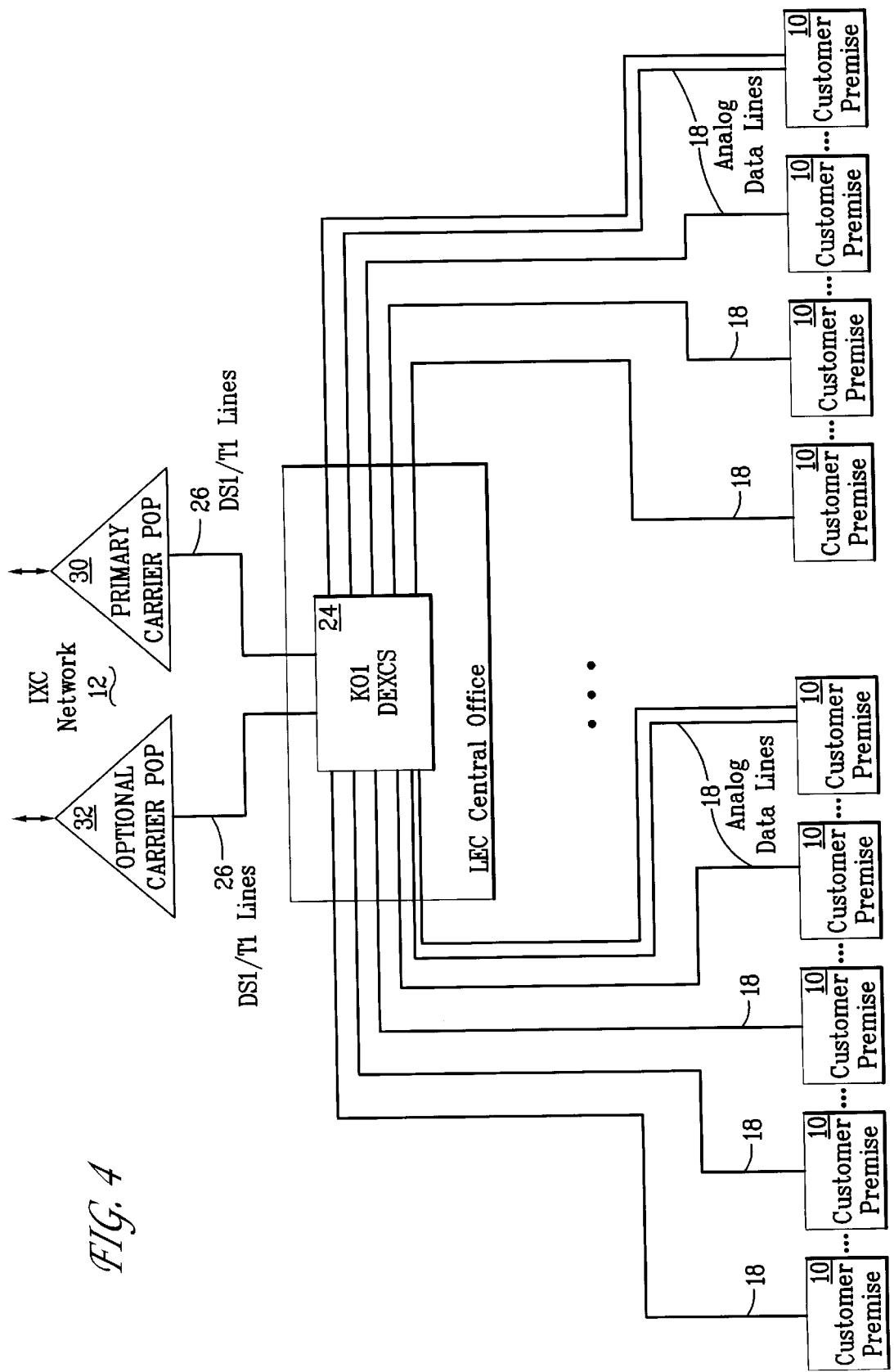
FIG. 4 illustrates the hardwire connection between the subscriber premises and the IXC network as in FIG. 1 except that analog data lines from the customer premises are connected directly to the DEXCS frame.

Those skilled in the art will further appreciate that direct analog connections could be utilized to connect the customer premises equipment 10 directly to the DEXCS frame 24 at the LEC Central Office as illustrated in FIG. 4. Such a LEC bypass approach is available by virtue of the fact that the DEXCS frame 24 will accept analog interface cards which are a tariffed service provided by the LEC at the LEC Central Office. In the embodiment of FIG. 4, the DEXCS frame 24 can be programmed as FXS signaling at the tandem side of the office and FXO to the T1 carrier side. A cross-connect would then be established in a conventional manner in order to complete the circuit pathway. However, those skilled in the art will appreciate that the cost of such an analog connection and long haul analog lines would be prohibitively expensive and are not presently preferred. Since the key element in the marketability of the present invention is the ability to provide bundled transport to lower the bypass costs, the approach of FIG. 4 is not presently cost effective.

INDEPENDENT CENTRAL OFFICE

Figure 5:
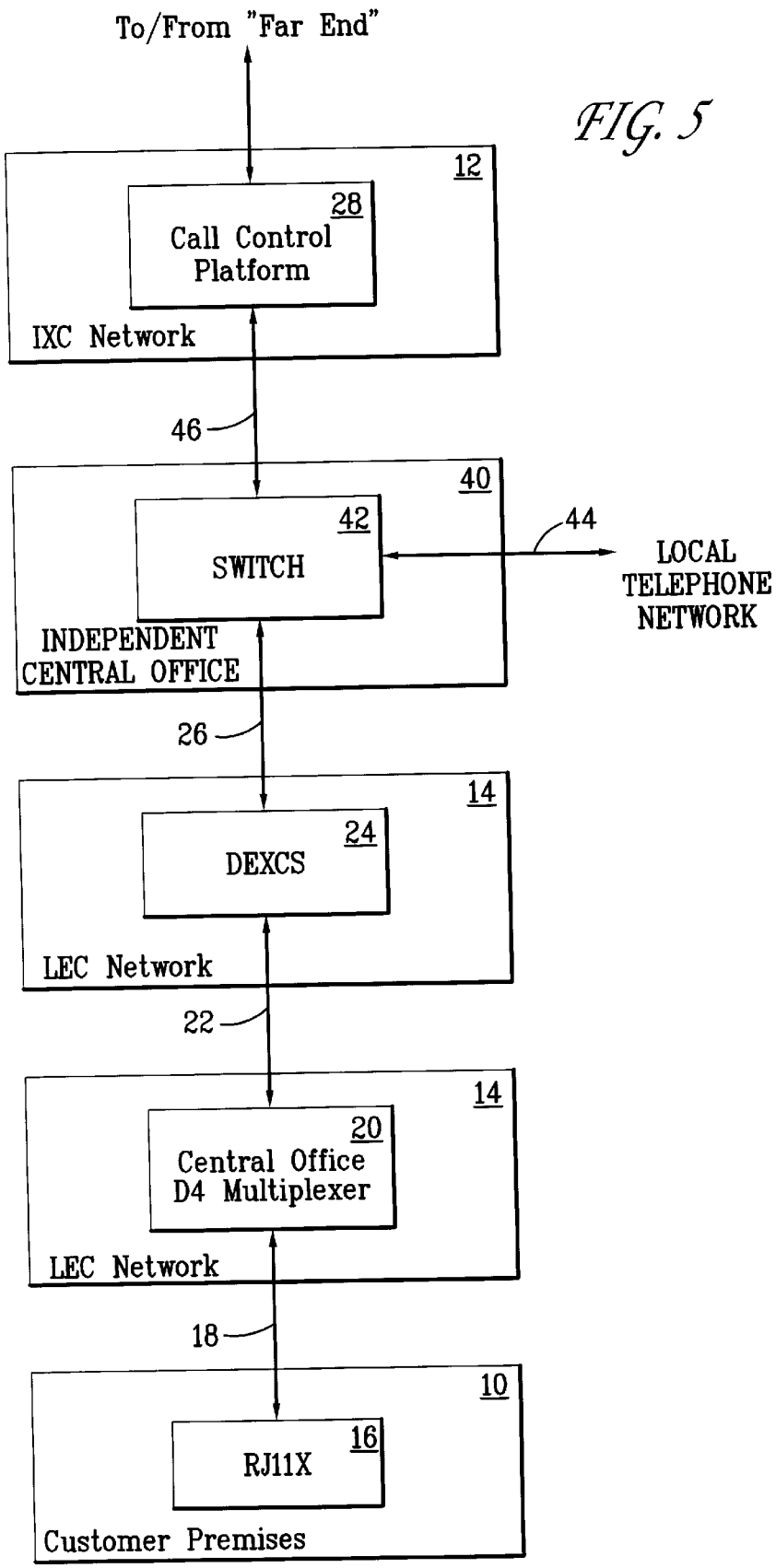
FIG. 5 is an overall block diagram illustrating the hardwire connection between the subscriber premises and an independent Central Office in accordance with the invention.
Figure 6:
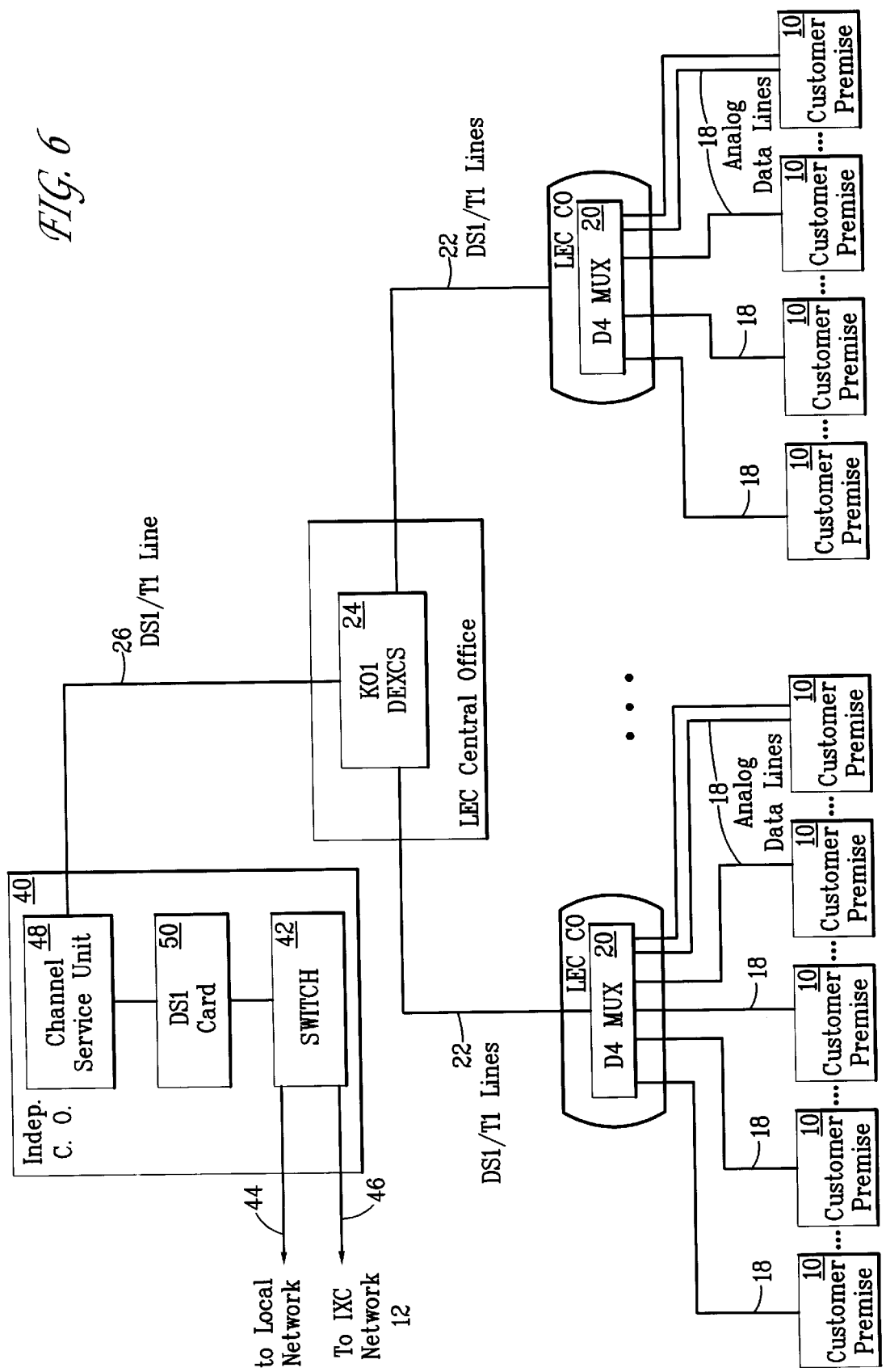
FIG. 6 illustrates in more detail the hardwire connection between the subscriber premises and an independent Central Office in accordance with the invention.
Figure 7:
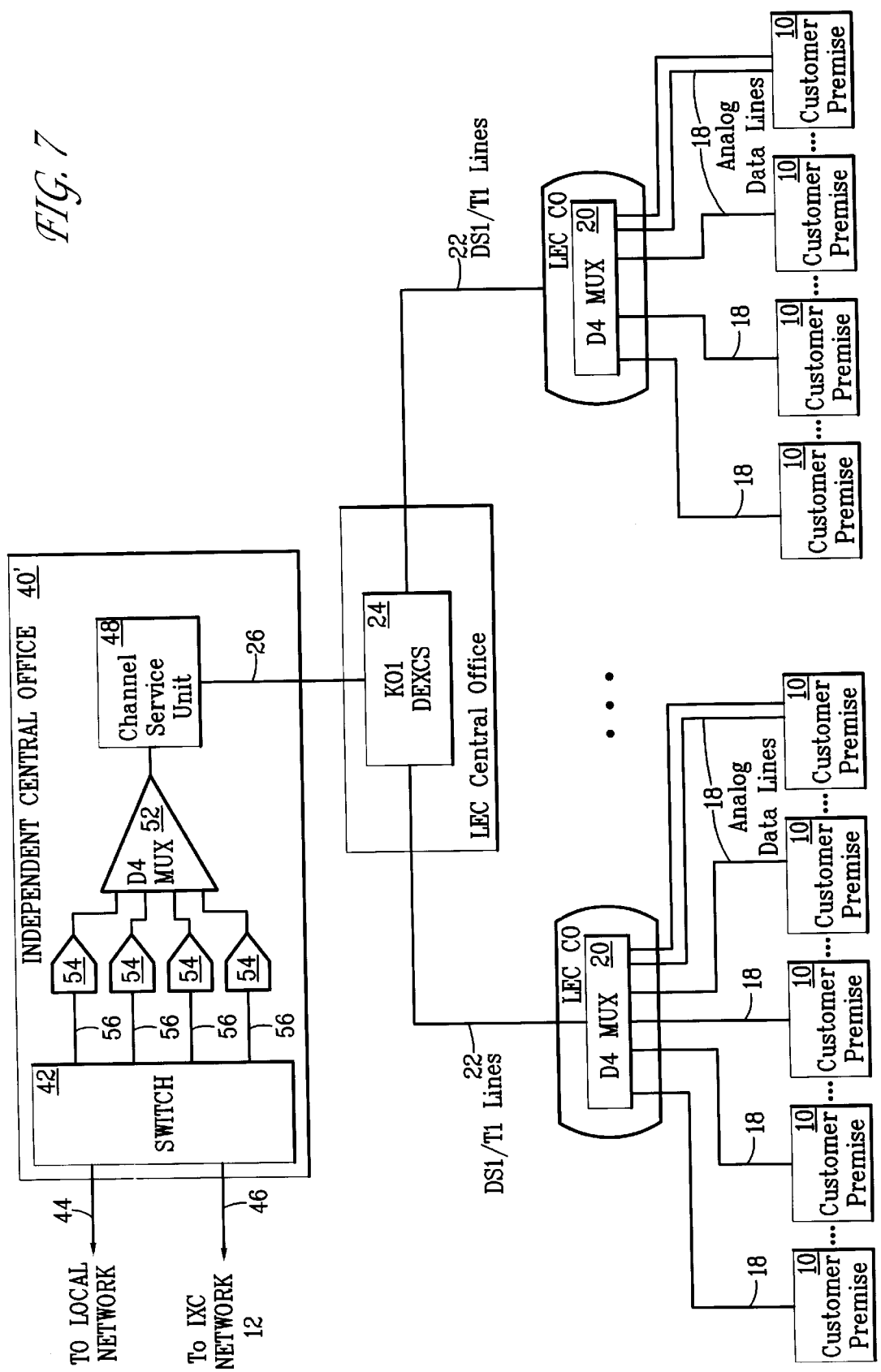
FIG. 7 illustrates the hardwire connection between the independent Central Office and the DEXCS frame as in FIG. 6 except that the DS1 card is replaced with a D4 multiplexer and analog trunk cards.

The embodiments of FIGS. 5–7 of the present invention relate to a method and apparatus for bypassing LEC equipment tariffed for voice services to provide analog voice grade communications from a caller via an independent Central Office (CO) to a called party by utilizing existing tariffed network data services. As shown in FIG. 5, such bypass is accomplished in accordance with a preferred embodiment of the invention by creating a hardwire connection between the customer premises 10 and the independent Central Office 40 via the LEC network 14 using only LEC equipment tariffed for data transmission. As in the embodiments of FIG. 1–4, the terminating end of the hardwire connection is installed at the customer premises 10 and terminated on a standard RJ11X four wire jack 16. An analog data line 18 is connected directly to the LEC's Central Office D4 multiplexer 20 instead of the conventional DS0 digital data line. The voice interface modules typically used in the D4 multiplexer are replaced by Foreign Exchange Subscriber (FXS) modules to provide A/D and D/A conversion of the voice data provided over the analog data line 18 and to introduce an analog carrier into the D4 multiplexer 20 which is programmed to provide ground start or E & M signaling at the bit level (A=1; B=0) to provide the routing and voice data to the IXC network 12 using techniques known in the art. A T1 or T3 high capacity digital line 22 which is D4/AMI or ESF/B8ZS configured for 56 or 64 kbps DS0 channels connects the Central Office D4 multiplexer 20 to a tandem "toll" Central Office and is terminated on a K01 digital electronic cross-connect system (DEXCS) frame 24 which provides software switching of digitized voice data at the channel level. As in the embodiments of FIGS. 1–4, the K01 DEXCS frame 24 is preferably ordered from the LEC as a reconfigurable data service with customer access, and each of the channels of the T1 line 22 is then configured by the customer using the reconfiguration service at the end pointing towards the Central Office D4 multiplexer 20 with Foreign Exchange Office (FXO) Loop Start signaling. A T1 or T3 line 27 which is D4/AMI or ESF/B8ZS configured for 56 or 64 kbps DS0 channels connects the DEXCS frame 24 to the independent Central Office 40. A switch 42 within the independent Central Office 40 then terminates the connection at either the local telephone network connection available from the Incumbent LEC via the T1 or T3 transmission line 44, or at the IXC network 12 via a T1 or T3 transmission line 46. Each of the channels of the line 27 is also configured by the customer using the reconfiguration service at the end pointing towards the Central Office and IXC with FXS Loop Start signaling. The lines 44 and 46 from the independent Central Office 40 may be conventional T1 or T3 lines and need not be specially configured. As in the above embodiments, the IXC Network 12 terminates the transmission line 46 within its own Call Control Platform 28 and switches the call to/from the called party/calling party premises and performs all required features associated with the call connection in a conventional manner.

FIG. 6 illustrates the hardwire connection of FIG. 5 in more detail. Since many of the elements are configured and perform in the same manner as described above with respect to FIG. 2, only the elements of the independent Central Office 40 will be described in detail. It will be appreciated by those skilled in the art that the other elements of FIG. 6 function in the same manner as described above with respect to like numbered elements.

In the embodiment of FIG. 6, a digital network is provided via a physical medium such as a T1, 2-wire, or 4-wire lines 27 which connect to a standard Channel Service Unit (CSU) 48 of an independent Central Office 40. In the embodiment of FIG. 6, independent Central Office 40 further comprises telephone switching equipment such as a private branch exchange ("PBX") 42 of the type available, for example, from Lucent Technologies as its Definity G3 PBX system further equipped with a DS1 card 50. The CSU 48 preferably interfaces with the DS1/T1 line 27 and provides the line power and a place for the carrier to loop back the DS1/T1 line 27 for line inspection. CSU 48 also provides the correct physical network termination for the DS1/T1 line 27, as well as isolation and physical line protection. The CSU 48 further provides a combination of two functions defined by the public network carriers: (1) correct T1 framing and (2) synchronous protocol translation. As known to those skilled in the art, the CSU 48 can be found as either a stand-alone unit or incorporated into other equipment (such as multiplexers, Network Interface cards, and routers, such as telephone switching equipment 42).

The DS1 card 50, on the other hand, functions in effectively the same manner as a D4 Multiplexer by breaking down DS1 channels into DS0 channels and allowing the usable bandwidth to interact directly with the telephone switching equipment 42 at the independent Central Office 40. In particular, DS1 card 50 functions as a Line-Side T1 interface which provides communications to remote locations by providing off-premise extensions to remote locations. Analog telephone functionality is extended over T1 facilities and channel bank units to provide the telephone at the remote site with full access to 2500-type line functionality. In accordance with the invention, the software of the telephone switching equipment 42 is optioned to condition the DS1 channels of the DS1 card 50 as FXO. Thus, the telephone switching equipment 42 could replace the IXC as the terminating point of the local network. Alternatively, as in the embodiments of FIGS. 1–4, the telephone switching equipment 42 may terminate at the IXC network 12.

As will be explained in more detail below with respect to FIG. 8, the telephone switching equipment 42 could be used to extend conventional LEC Central Office services, such as Public Dial Tone, Call Waiting, Call Forwarding, Three Way Calling, Caller ID, Internet access, security system monitoring, and the like to the customer premise 10. Also, as noted above, the telephone switching equipment 42 may be a Lucent Technologies Definity G3 PBX system which provides access to long distance service via line 46. In addition, those skilled in the art will appreciate that the T1 lines illustrated in FIGS. 5 and 6 may be replaced by T3 lines or optical carrier lines ((OC3 or OC12) as noted above with respect to the embodiment of FIG. 3.

In the alternative embodiment illustrated in FIG. 7, the independent Central Office 40' is reconfigured by replacing the DS1 card 50 with a D4 channel bank 52 which is placed in front of the telephone switching equipment 42 to allow the use of analog trunk cards or OPX analog line cards 54 which connect to the telephone switching equipment 42 via analog trunk lines 56. As known to those skilled in the art, the analog trunk card is a standard card for accepting analog stations, such as is commonly used in PBX-type applications. The OPX analog line card, on the other hand, is another remote service that provides the ability to extend features and services to 2500-type telephones located remotely from the independent Central Office telephone switching equipment 42. The OPX analog line card interfaces with facsimile, key systems, Centrex, and other external telephone equipment requiring a standard analog line interface. It also provides inherent lightning and power cross protection typically required for off-premise locations or campus environments. The OPX analog line card also accepts standard analog 4-wire interfaces and interprets the information directly to the telephone switching equipment 42.

TELEPHONE SERVICES PLATFORM FOR NEW DEVELOPMENTS

In the embodiments of FIGS. 1–3 and 5–7 it was assumed that the D4 multiplexer 20 was provided as part of the Central Office equipment owned and operated by the incumbent LEC. However, in accordance with a presently preferred embodiment of the invention illustrated in FIGS. 8–10, the D4 multiplexer 20 need not be owned and operated by the incumbent LEC. Instead, as illustrated in FIG. 8, the D4 multiplexers 20 of the Central Office may be replaced by privately owned stand alone D4 multiplexers 58 not provided by the LEC 14 as part of the Central Office equipment. In FIG. 8, where like numbers represent like elements from the above embodiments, the lines 60 connecting the customer premise 10 to the D4 multiplexers 58 are private copper wire cable instead of the LEC provided analog data lines 18 described above. In the embodiment of FIG. 8, the privately owned D4 multiplexers 58 may be provided outside in a weatherproof housing 62 with an uninterruptible power source (UPS) so as to provide a simple independent Central Office capability in accordance with the invention which is free of most right of way concerns.

Figure 8:
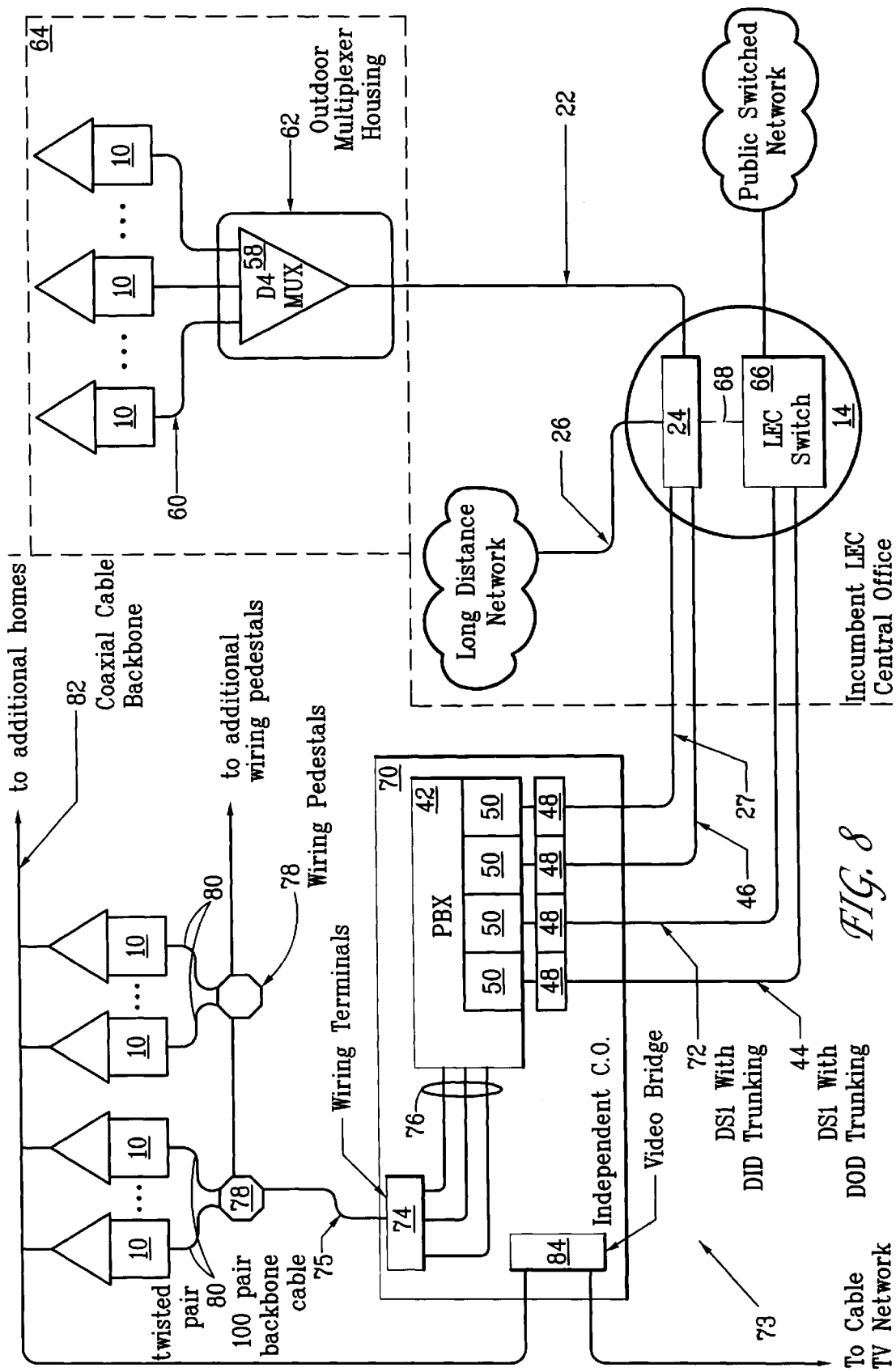
FIG. 8 illustrates the hardwire connection between an independent Central Office in a new residential housing development, the subscriber premises, and the incumbent LEC Central Office in accordance with the presently preferred embodiment of the invention.

In the presently preferred embodiment of the invention, the privately owned D4 multiplexers 58 are placed in new residential housing developments (single detached, attached, or multi-family) or new commercial developments 64 as indicated by dotted line in FIG. 8. In accordance with the invention, new copper wire or twisted pair cable 60 is laid from the D4 multiplexers 58 to each new home during construction but control of these lines is not relinquished to the Incumbent LEC when construction is completed.

The D4 multiplexer 58 is preferably contained in an environmentally protected, climate controlled, vandal proof housing 62 suitable for outdoor use on the premises of the new residential or new commercial development 64. The housing 62 preferably contains two RJ-48S interfaces, two CSU cards, and up to forty-eight Nx56/64 voice/data card slots. The slot types are preferably universal in nature and adapted to accommodate FXS, E&M, Office Channel Unit Data Port (OCUDP), OPX, and NT1 interfaces. Housing 62 preferably mounts directly onto a concrete slab with two one inch conduit ducts (Network Interface and 120 VAC) and one four inch conduit duct (Customer Side Interface). The Customer Side Interface (CSI) preferably has an access panel allowing easy access to two 48 pin punchdown blocks. A fully redundant Uninterruptible Power Supply (UPS) system with at least a four hour backup is also provided. The D4 multiplexers 58 may be independently controlled by an independent telecommunications service company to provide long distance services via T1 line 22, DEXCS frame 24, and T1 line 26 using the techniques described above. Access to the public switched network for local service could continue to be provided by the Incumbent LEC Central Office 14 by connecting the DEXCS frame 24 directly to the Incumbent LECs switch 66, such as the 5ESS or DMS100 tariffed for voice services, via T1 line 68. However, in this case, the customer only receives cost savings for long distance services; LEC local service charges would continue to be charged for access to the LEC switch 66.

On the other hand, savings for local as well as long distance services may be provided to the customers of the new development 64 in accordance with the presently preferred embodiment of the invention by further providing an Independent Central Office facility 70 of the type illustrated in FIG. 8. As in the embodiments of FIGS. 5–7, Independent Central Office 70 is accessed by the customer via the DEXCS frame 24 and T1 line 27 and contains a switch 42 such as a private branch exchange ("PBX") including Channel Service Unit cards 48 and DS1 cards 50. Access to the long distance network is preferably provided by the switch 42 by connecting an incoming call on incoming T1 line 27 to outgoing T1 line 46 for connection to the long distance network via DEXCS frame 24 and T1 line 26. However, in accordance with the invention, access to local services may also be provided without payment of conventional LEC local service charges for residential voice service by providing Direct Inward Dialing (DID) across digital high capacity trunk lines 72 and Direct Outbound Dialing (DOD) across digital high capacity trunk lines 44 purchased by the Independent Central Office 70 from the Incumbent LEC Central Office 14.

Those skilled in the art will appreciate that DID and DOD across digital high capacity lines provides an 8:1 ratio of subscribers to lines. DID numbers are assigned Automatic Number Identification (ANI) codes from the Incumbent LEC, which is currently a tariffed commercial service, substantially less per minute than tariffed residential customer voice service. When a DID number is dialed from within the public switched network, it is routed to an available channel on the PBX 42, which, in turn, picks up the ANI code and switches the call to the terminating station line (subscriber), who may be a subscriber in new development 64 or a subscriber in new development 73 (described in more detail below). On the other hand, calls originating within the subscriber houses 10 serviced by the Independent Central Office 70 are provided to the LEC switch 66 via DOD trunk lines 44. Those skilled in the art will appreciate that this arrangement is similar to a corporate PBX environment where such a ratio of lines to subscribers is commonly used. However, those skilled in the art will further appreciate that such facilities have not previously been provided to residential customers in a residential neighborhood as proposed herein with the substantial cost savings to residential subscribers.

To put the cost savings in perspective, it is noted that 150 residential subscribers may be serviced by 150/8=19 inbound/outbound lines, whereby the Independent Central Office 70 need only purchase 19 inbound/outbound lines from the Incumbent LEC 14 but may sell 150. Moreover, the 19 inbound/outbound lines purchased from the Incumbent LEC 14 are tariffed at the lower commercial DID/DOD rate than the typical residential voice rate, resulting in significant additional cost savings.

Conventionally, DID/DOD digital trunk service purchased from the Incumbent LEC 14 allows a customer (in this case, the Independent Central Office 70) to use a DS1 (1.544 Mbps) facility to transport PBX type services, including Direct Inward Dialing (DID), Direct Outward Dialing (DOD), Wide Area Telecommunications Service (WATS), or Custom 800 service from a wire center (Incumbent LEC 14) specified by the customer to their premises. The wire center must be within the same Local Access and Transport Area (LATA) as the customer location but does not have to be the normal serving wire center. As noted above, this service provides a cost effective method of delivering switched exchange access service via a DS1 facility. It also provides the subscriber with a digital handoff of the many PBX type services previously unavailable to residential subscribers, which services can terminate directly into the PBX 42 of the Independent Central Office 70. This direct interface provides the customer with significant customer premise equipment cost savings while also providing the many PBX features at little or no additional cost.

Typically, a DID/DOD arrangement provides for the equivalent of 24 exchange access lines between a wire center and the PBX 42 of the Independent Central Office 70. These 24 channels may be used as trunk lines to PBX equipment 42 as proposed, and may provide DID, DOD, WATS, or Custom 800 service. Typically, the monthly charge for such Digital Trunk Service includes 24 services; however, the Independent Central Office 70 does not have to turn on all 24 services at the same time. In addition, all DID and DOD service may be provided directly from the trunk side of a digital Incumbent LEC Central Office switch 66. In an analog Incumbent LEC Central Office 14, on the other hand, a multiplexer must be used to convert the analog signals to digital signals. The use of the DS1 to transport the DID service to the customer end does not change the way DID works without the DS1, nor does it allow other features that would not be currently offered under the tariff.

Those skilled in the art will appreciate that DID service allows incoming calls to PBX 42 from the public switched network to go directly to a specific station line at a subscriber residence so that a PBX attendant is unnecessary. Such DID service, without outward dialing capability, uses one-way, incoming trunks. DID phone numbers must be ordered in multiples of 100, where each station is assigned an individual telephone number.

In the embodiment of FIG. 8, the D4 Multiplexer 58 and the Independent Central Office are preferably built in new residential developments and commercial developments while the developments are under construction so that it is not necessary to obtain additional telephone right-of-ways and the like for laying phone lines or cables. Preferably, the Central Office 70 and D4 Multiplexer 58 are part of the design plans for the new development and are constructed as the development is being built. As shown in FIG. 8, a small housing development in a particular LATA may simply use a D4 multiplexer 58, while a larger housing or commercial development 73 in that same LATA may instead include an Independent Central Office 70. Generally, at least one Independent Central Office is required per LATA. In this fashion, a particular developer who is active in a given LATA will not have to build more Independent Central Offices 70 than is necessary to service the housing units built by that developer in that LATA.

The D4 Multiplexer 58 allows T1 lines purchased from the Incumbent LECs to be used to connect small developments 64 to the Independent Central Office 70 without having to run cable to, or buy a switch for, the small developments. In effect, the D4 Multiplexer 58 allows the switching services of the Independent Central Office 70 to be extended using tariffed T1 service so that it remains cost effective to service small developments using the techniques of the invention. On the other hand, large housing development 73 may be served directly by on-site Independent Central Office 70, where local service is provided from the Incumbent LEC Central Office 14 via DID trunk 72 and DOD trunk 44 as in a conventional office environment. Long distance service, on the other hand, is provided via DEXCS frame 24 using the afore-mentioned LEC bypass techniques.

The Independent Central Office 70 connects to the homes 10 within the new residential housing (single detached, attached, or multi-family) development 73 via punch down blocks or wiring terminals 74, which function to separate out the respective twisted pairs of a 100 pair backbone cable 75 servicing the development 73 and to connect the respective twisted pairs to respective ports 76 of the PBX 42. 100 pair backbone cable 75 connects respective outdoor weatherproof wiring pedestals 78 within the housing development 73, which, in turn, terminate a plurality of twisted pairs 80 into respective subscriber homes 10. As noted above, backbone cable 75 and twisted pairs 80 are preferably laid in the virgin ground during the building of the housing development 73 so as to eliminate all right-of-way concerns and to minimize infrastructure costs. The Independent Central Office 70 is preferably built during the building of the housing development 73 and subsequently used to manage, in addition to local and long distance calling services, cable television and other services provided to the housing development 73 via coaxial cable backbone 82 and any other high capacity data line laid in the telephone lines right-of-way. For example, the coaxial cable backbone 82 can be laid using the same right-of-ways as the telephone lines and similarly terminate at the Independent Central Office 70 for connection to a cable television network via a video bridge (amplified splitter) 84. In this fashion, the developer, via the Independent Central Office 70, may maintain control of all cable television and telephone services provided to housing development 73. Also, a high capacity data line may be laid in the same right-of-way and managed by the Independent Central Office 70 to provide a plurality of data services to the residential housing development 73. Of course, a new commercial development would be wired in similar fashion.

Once the new residential housing (or commercial) development 73 with Independent Central Office 70 is wired as shown in FIG. 8, local telephone service is ordered from the Incumbent LEC Central Office 14 as follows.

Step 1: Identify the location of the Independent Central Office 70 and the location of the serving wire center (Incumbent LEC Central Office 14) for the DS1 facility.

Step 2: Identify the type of Central Office the DS1 will terminate in. An analog Central Office will require a multiplexer, while a digital Central Office requires a multiplexer except for DID.

Step 3: Identify the type and quantity of services to be ordered (DID/DOD).

Step 4: Determine the channel number assignments (blocks of 100).

Step 5: Identify the type of PBX used (e.g., Lucent Definity G3 PBX) and the terminating equipment at the Independent Central Office (e.g., CSU 48).

Step 6: Provide the information gathered in steps 1–5 to the Incumbent LEC to place the order for DID/DOD service.

Step 7: When the DS1 line is installed by the Incumbent LEC, install the DS1 card into the PBX 42.

Step 8: Program the PBX's translation table to assign the telephone numbers to the subscriber lines (DID), including subscribers serviced via certain D4 multiplexers 58 in that LATA.

Step 9: Program all local outbound traffic to route through the DS1 (DOD) line 44.

Outbound calls from and inbound calls to subscribers 10 in residential community 73 via Independent Central Office 70 will now be described with respect to FIGS. 9 and 10, respectively.

Figure 9:
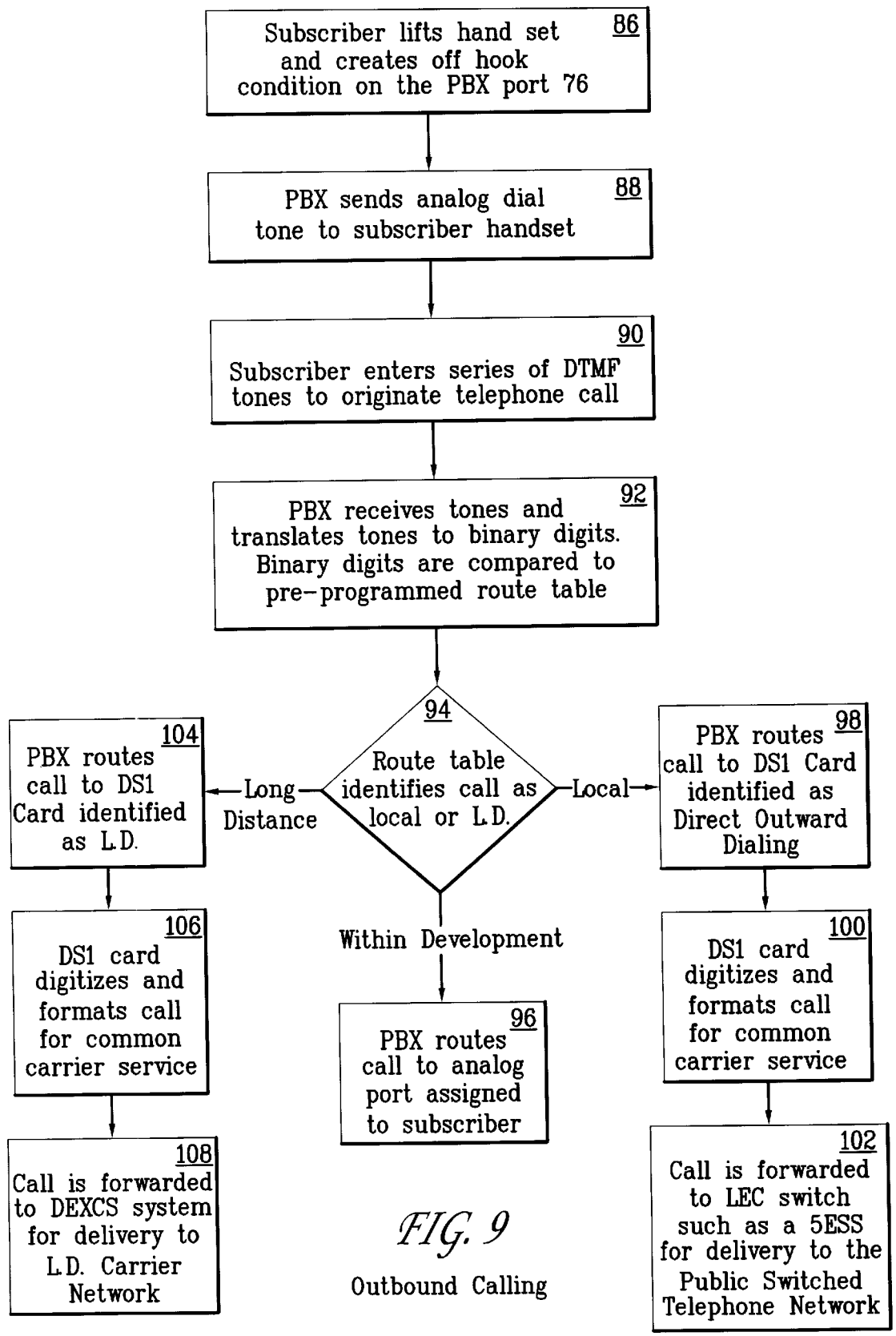
FIG. 9 illustrates the flow of an outbound call from a subscriber's premise in the new residential housing development of the embodiment of FIG. 8.

As shown in FIG. 9, subscriber 10 in residential community 73 begins a call at step 86 by lifting a hand set and creating an off hook condition on a port 76 of PBX 42. The PBX then sends an analog dial tone to the subscriber's hand set at step 88. Upon receipt of dial tone, the subscriber enters the desired phone number at step 90 as a series of, e.g., DTMF tones to originate the telephone call. At step 92, the PBX 42 receives the DTMF tones and translates them to binary digits in a conventional manner. The binary digits are then compared to the pre-programmed route table in the PBX, and at step 94, the route table identifies the call as a local call within the development, as a local call outside the development, or as a long distance call. If the call is a local call within the development, the PBX 42 routes the call at step 96 to the analog port 76 assigned to the designated subscriber as in a conventional PBX office setup. On the other hand, if the call is a local call outside the development, at step 98 the PBX 42 routes the call to the DS1 card provided for DOD, where the DS1 digitizes and formats the call for common carrier service at step 100. The call is then forwarded at step 102 to the Incumbent LEC switch 66, such as a 5ESS, via DS1 trunk line 44 for delivery to the Public Switched Network. However, if the route table identifies the call at step 94 to be a long distance call, at step 104 the PBX 42 routes the call to the DS1 card provided for long distance, where that DS1 digitizes and formats the call for common carrier service at step 106. The call is then forwarded at step 108 to the DEXCS frame 24 at the Incumbent LEC Central Office 14 via DS1 line 46 for delivery to the Long Distance Network.

Calls are originated by a subscriber 10 in new housing development 64 using the bypass techniques described above with respect to FIGS. 1–7. Once the call is received via DS1 line 27 by the PBX 42, the call is evaluated as described above with respect to steps 94–108.

Figure 10:
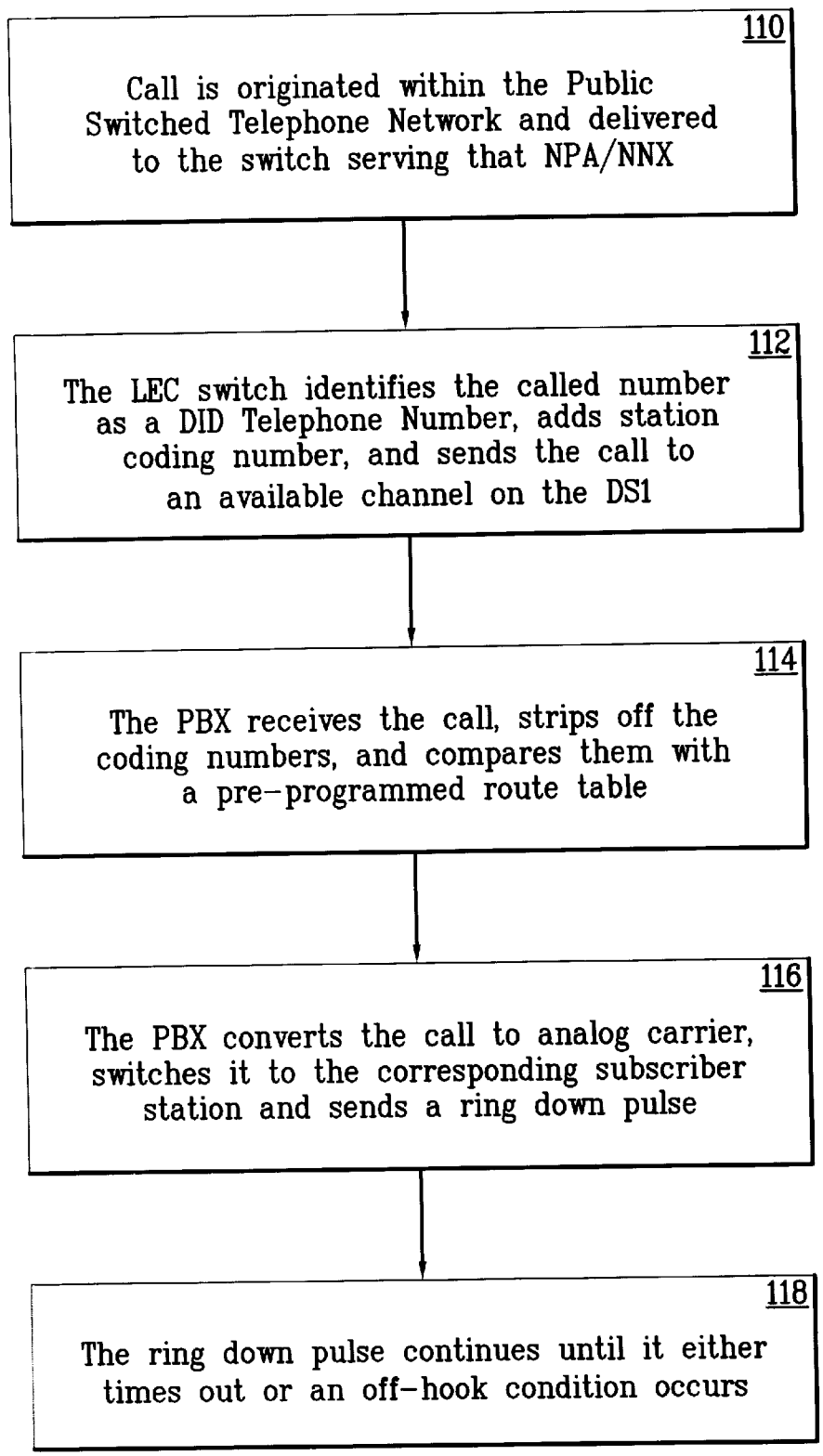
FIG. 10 illustrates the flow of an incoming call to a subscriber's premise in the new residential housing development of the embodiment of FIG. 8.

Incoming calls to a subscriber 10 in new housing development 73 are handled as illustrated in FIG. 10. In particular, a call originated within the Public Switched Network designating the prefix for Incumbent LEC switch 66 is delivered at step 110 to Incumbent LEC switch 66 in a conventional manner. At step 112, the Incumbent LEC switch 66 identifies the called number as a DID telephone number, adds station coding numbers, and sends the call to an available channel of the DS1 trunk line 72 to the PBX 42. At step 114, PBX 42 receives the call, strips off the coding numbers, and compares them with the pre-programmed route table in the PBX 42. At step 116, the PBX 42 converts the call to analog carrier, switches the call to the corresponding subscriber station, and sends a ring down pulse. Then, at step 118, the ring down pulse continues until it either times out or an off-hook condition occurs.

Calls to a subscriber 10 in new housing development 64 are routed using the bypass techniques described above with respect to FIGS. 1–7. Once the call is received via DS1 line (DID) 72 by the PBX 42, the call is evaluated as described above with respect to steps 94–108 and routed to the subscriber 10 via outgoing DS1 line 46, DEXCS frame 24, DS1 line 22, D4 Multiplexer 58, and lines 60 to subscriber 10 in new development 64.

As so described, the hardwire telephone platform of the invention substantially differs from the prior art in that an Independent Central Office is provided which can provide local and long distance services in competition with the Incumbent LECs while providing no infrastructure other than that for a new community, which would have to be added in any case. In particular, the wiring system of the invention uses twisted pair, coaxial cable, and/or another form of medium which is installed during an early phase of construction in a new residential housing (single detached, attached, or multi-family) or a new commercial development. For large developments, the Independent Central Office is provided in a building or some other facility erected within the development to house the head end electronics and to provide an interface to the public switched network. For smaller developments, a private D4 multiplexer is provided which connects into an Independent Central Office within that LATA.

At present, it is contemplated that an IXC may utilize the Central Office platform of the invention to provide local services including originating access without payment of LEC access fees. The access fees would instead be under the control of a telecommunications service company for the developer who put the Central Office into the new residential or commercial development. Since the access fees would thereby be removed from LEC control, the IXC could negotiate a separate deal with the developer's telecommunications service company at rates which would, through natural competition, dramatically lower the per minute cost of long distance service, thereby yielding a tremendous competitive advantage over existing long distance competitors required to continue to pay the relatively high access fees to the Incumbent LECs. Alternatively, the local and long distance service could be provided solely by the telecommunications service company for the developer. Also, since local service would be provided via tariffed commercial DID/DOD services rather than tariffed residential voice services, local access to the public switched network could be provided by the telecommunications services company with increased functions and lower costs.

Utilizing a wire line or wireless tele-communications platform, a plurality of services including local, long distance, Internet access, and security monitoring can be provided. Additionally, those skilled in the art will appreciate that this CO platform, in conjunction with a coaxial cable backbone or in conjunction with an additional high capacity data line laid in the same right-of-way, may provide these additional services: pay-per-view movies, interactive video games, interactive education, video telephony, video conferencing, electronic banking, environmental monitoring, utility monitoring, video surveillance, card access monitoring, bulletin board services, fax services, printing services, and customized electronic news. Further cost savings in implementing these features may be obtained by fully automating each Independent Central Office monitoring facility and remotely controlling the Independent Central Office facility from a regional monitoring facility. In addition, all data for billing and service charges may be captured by the on-site electronics in a conventional manner and forwarded to a central processing point for dissemination and bill generation.

The private PBX platform of the invention permits a number of system enhancements. For example, the PBX may incorporate an enterprise communications server application which will allow voice, data, video, wireless, and other types of communications between end-points such as voice terminals, data terminals, computers, transceivers, and the like. The PBX may also support both analog and digital formats in both voice and data applications. Moreover, through the use of standard protocols, such as those commonly used on Local Area Networks (LANs) to connect nodes to an enterprise network, a wireless connection can be established such as described in U.S. Pat. No. 5,446,736 to allow the extension of the communication platform of the invention beyond the range of the new developments as described herein. In addition to station connectivity, the PBX may also support a wide number of interfaces including X.25, RS-232, Contact interfaces (analog line circuits for connecting the system to analog devices), and Network Interfaces (analog or digital interfaces, such as central office DID, DOD, common trunking, analog measured service, and ISDN basic and primary rate interfaces).

Similarly, the private D4 multiplexer platform of the invention permits a number of system enhancements. For example, a D4 multiplexer may be used by Incumbent LECs to provide additional facilities. As an example, if an RBOC had a commercial development or industrial park in which it had a 100 pair cable running to the park, and it had already sold 100 trunk lines to the industrial park's customers, and one of those customers ordered 10 more new lines, today the RBOC would have to string a new 100 pair cable to the park to meet the 10 line demand. This process is very expensive and very labor intensive even though the RBOC owns the conduits and right-of-ways. The use of a D4 multiplexer would be much cheaper since the RBOC could install a D4 multiplexer on-site, take 2 pair from the existing 100 and convert those 2 pairs to a T1 signal for termination on the D4 multiplexer. Since the T1 line can handle 24 DS0 lines, this creates a new net capacity of 22 pairs (24 new pairs minus 2 old pairs) at the industrial park. Moreover, Competitive LECs (CLECs) could use the D4 multiplexer to pick up small residential or commercial developments without running additional cabling.

Although exemplary embodiments of the invention have been described in detail above, those skilled in the art will readily appreciate that many additional modifications are possible in the exemplary embodiment without materially departing from the novel teachings and advantages of the invention. For example, another modulation scheme besides the foreign exchange modulation scheme may be implemented in accordance with the invention. Also, those skilled in the art will appreciate that in each case the T1 data lines described may be T1 or greater high capacity data lines (e.g., T3, OC3, OC12). In addition, those skilled in the art will appreciate that other telephone equipment besides a PBX may be used to provide the switching and Central Office functions at the independent Central Office. The Independent Central Office may also house electronics in support of numerous other functions. For example, Internet access facilities, a fixed wireless Airloop transceiver, and alarm monitoring devices may be installed at the Independent Central Office. Moreover, the switching equipment need not be analog but may be completely digital. Furthermore, the Independent Central Office need not be located within the new residential housing development or new commercial development but may be nearby or remote and connected to the wiring terminals using any of a number of wired or wireless protocols. Accordingly, these and all such modifications are intended to be included within the scope of this invention as defined in the following claims.

I claim:

1. A method of providing public switched network access to new residents/tenants of a new residential housing/commercial development, comprising the steps of:

placing telephone wires in said new residential housing/commercial development during construction of said new residential housing/commercial development;

terminating said telephone wires at respective subscriber premises in said new residential housing/commercial development and at a wiring terminal within said residential housing/commercial development;

connecting said wiring terminal to a telecommunications switch via a plurality of communications ports for said respective subscriber premises in said new residential housing/commercial development;

providing direct inward dialing (DID) and direct outbound dialing (DOD) to said telecommunications switch via respective DID and DOD trunk lines from a central office switch of a local exchange carrier (LEC), whereby said respective subscriber premises in said new residential housing/commercial development are connected to said public switched network via said telecommunications switch, said DID and DOD trunk lines, and said central office switch; and connecting new residents/tenants of another new residential housing/commercial development to said telecommunications switch for public switched network access, comprising the steps of:

placing telephone wires in said another new residential housing/commercial development during construction of said another new residential housing/commercial development, terminating said telephone wires at respective subscriber premises in said another new residential housing/commercial development and at a multiplexer including analog/digital and digital/analog conversion means, connecting said multiplexer to digital switching means tariffed for data services at said LEC central office via first multichannel digital data lines, and connecting said digital switching means to said telecommunications switch via second multichannel digital data lines, whereby said respective subscriber premises in said another new residential housing/commercial development are connected to said public switched network via said multiplexer, said digital switching means, said first and second multichannel digital data lines, said telecommunications switch, said DID and DOD trunk lines, and said central office switch.

2. A method of providing long distance network access to new residents/tenants of a new residential housing/commercial development, comprising the steps of:

placing telephone wires in said new residential housing/commercial development during construction of said new residential housing/commercial development;

terminating said telephone wires at respective subscriber premises in said new residential housing/commercial development and at a wiring terminal within said residential housing/commercial development;

connecting said wiring terminal to a telecommunications switch via a plurality of communications ports for said respective subscriber premises in said new residential housing/commercial development;

connecting said telecommunications switch to a particular output terminal of digital switching means tariffed for data services at a central office of a local exchange carrier (LEC) using first multichannel digital data lines; and connecting said particular output terminal of said digital switching means to said long distance network, said digital switching means connecting said telecommunications switch to said long distance network via said first multichannel digital data lines.

3. A method as in claim 2, comprising the additional step of connecting new residents/tenants of another new residential housing/commercial development to said telecommunications switch for long distance network access, comprising the steps of:

placing telephone wires in said another new residential housing/commercial development during construction of said another new residential housing/commercial development;

terminating said telephone wires at respective subscriber premises in said another new residential housing/commercial development and at a multiplexer including analog/digital and digital/analog conversion means;

connecting said multiplexer to said digital switching means via additional multichannel digital data lines, whereby said respective subscriber premises in said another new residential housing/commercial development are connected to said long distance network via said multiplexer, said first and second multichannel digital data lines, said digital switching means, and said telecommunications switch.

4. A method as in claim 3, comprising the additional step of connecting said new residents/tenants of said another new residential housing/commercial development to a public switched network by performing the additional step of connecting said digital switching means to a LEC switch tariffed for voice services at said central office of said local exchange carrier using further multichannel digital data lines.

5. A method of providing telephone switching services to telephone subscribers in a new residential housing development using a switch at a central office facility which is maintained independent of a LEC switch at an incumbent local exchange carrier central office facility, comprising the steps of:

building said independent central office facility in said new residential housing development;

connecting customer premise equipment of said telephone subscribers to said switch at said independent central office facility;

providing direct inward dialing (DID) and direct outbound dialing (DOD) to said switch of said independent central office facility via respective DID and DOD trunk lines from said LEC switch at said incumbent local exchange carrier central office facility; and connecting telephone subscribers of another new residential housing development to said switch at said independent central office facility, comprising the steps of:

placing a multiplexer including analog/digital and digital/analog converters at said another new residential housing development, connecting customer premise equipment of said telephone subscribers of said another new residential housing development to said multiplexer, connecting said multiplexer to digital switching means tariffed for data services at said incumbent local exchange carrier central office facility via first multichannel digital data lines, and connecting said digital switching means to said switch at said independent central office facility via second multichannel digital data lines.

6. A central office facility which is maintained independent of a switch tariffed for voice services at an incumbent local exchange carrier (LEC) central office facility, comprising:

a structure built in a new residential housing development containing a plurality of customer premises;

a private switch located within said structure, said private switch including a plurality of customer side ports and a plurality of LEC side ports;

wiring terminals which terminate wiring from said plurality of customer premises;

communications lines which connect said wiring terminals to said customer side ports of said private switch; and a channel service unit for each of said plurality of LEC side ports, certain of said channel service units connecting said private switch to said switch tariffed for voice services at said incumbent LEC central office facility via DID/DOD trunk lines.

7. A central office facility as in claim 6, wherein said new residential housing development includes a coaxial cable which provides video data to certain of said plurality of customer premises, said central office facility further comprising a video bridge which terminates said coaxial cable on one side thereof and terminates a coaxial cable from a cable television service provider at another side thereof.

8. A central office facility as in claim 6, wherein other of said channel service units connect said private switch to multichannel digital data lines which are further connected via a switch tariffed for data services at said incumbent LEC central office facility to a long distance network for the provision of long distance voice telecommunications services to said customer premises via said private switch.

* * * * *